Figure 1:
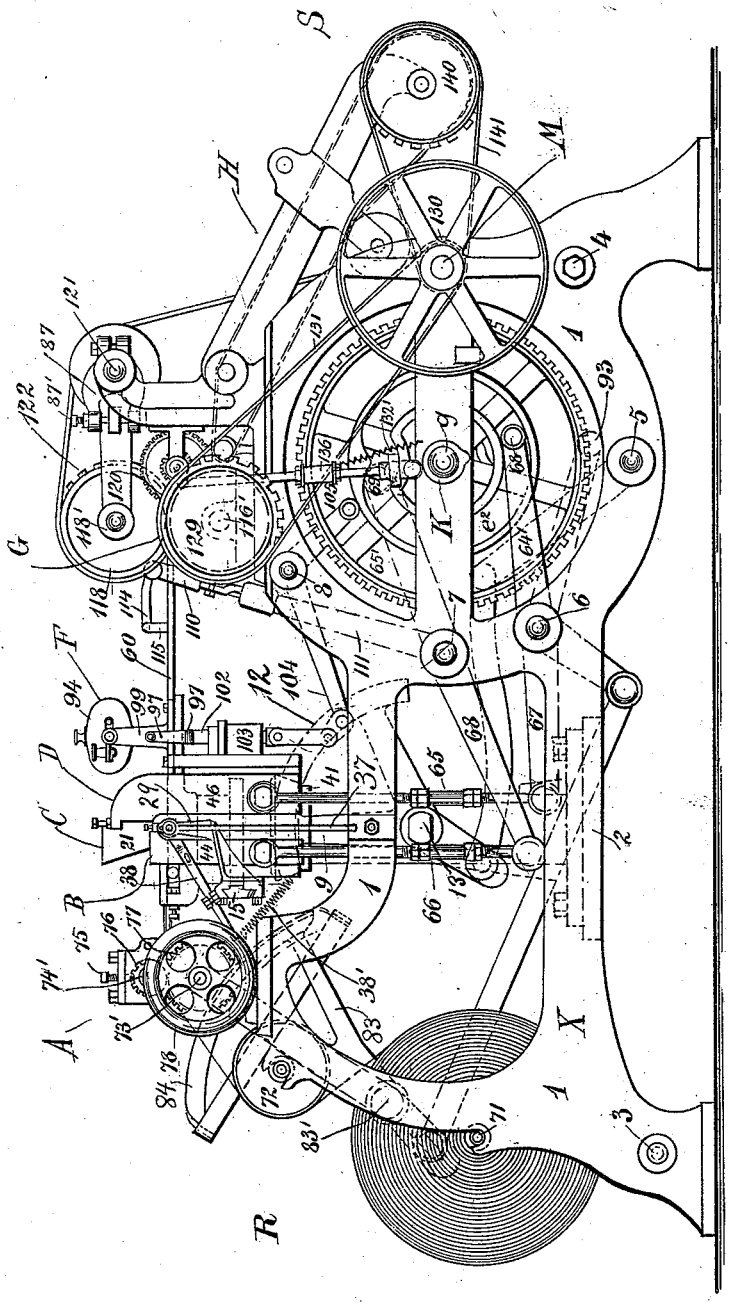

(No Model.) 13 Sheets—Sheet 1.
F. E. BLAISDELL.
MACHINE FOR MANUFACTURING PENCILS, &c.

No. 550,212. Patented Nov. 19, 1895.

WITNESSES:
J. Nussblatt
F. Richter

INVENTOR
Frederick Elijah Blaisdell
BY
Clarence Louch Davis
ATTORNEY.

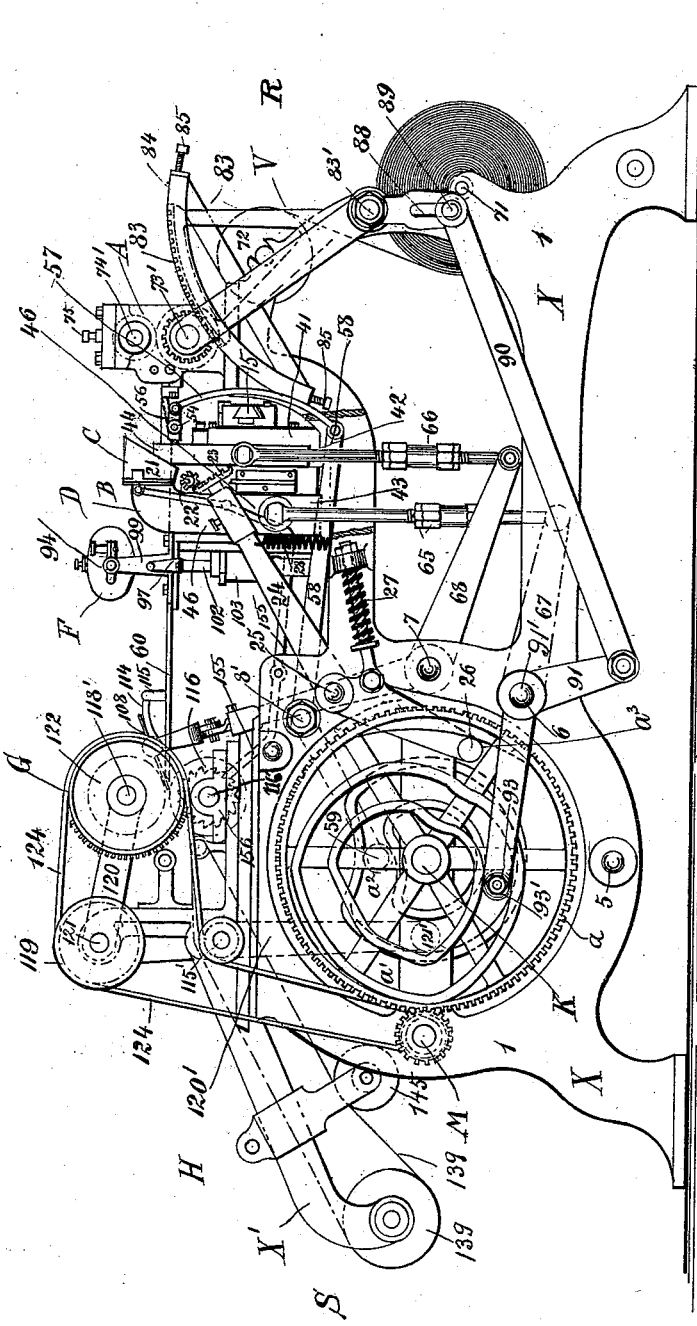

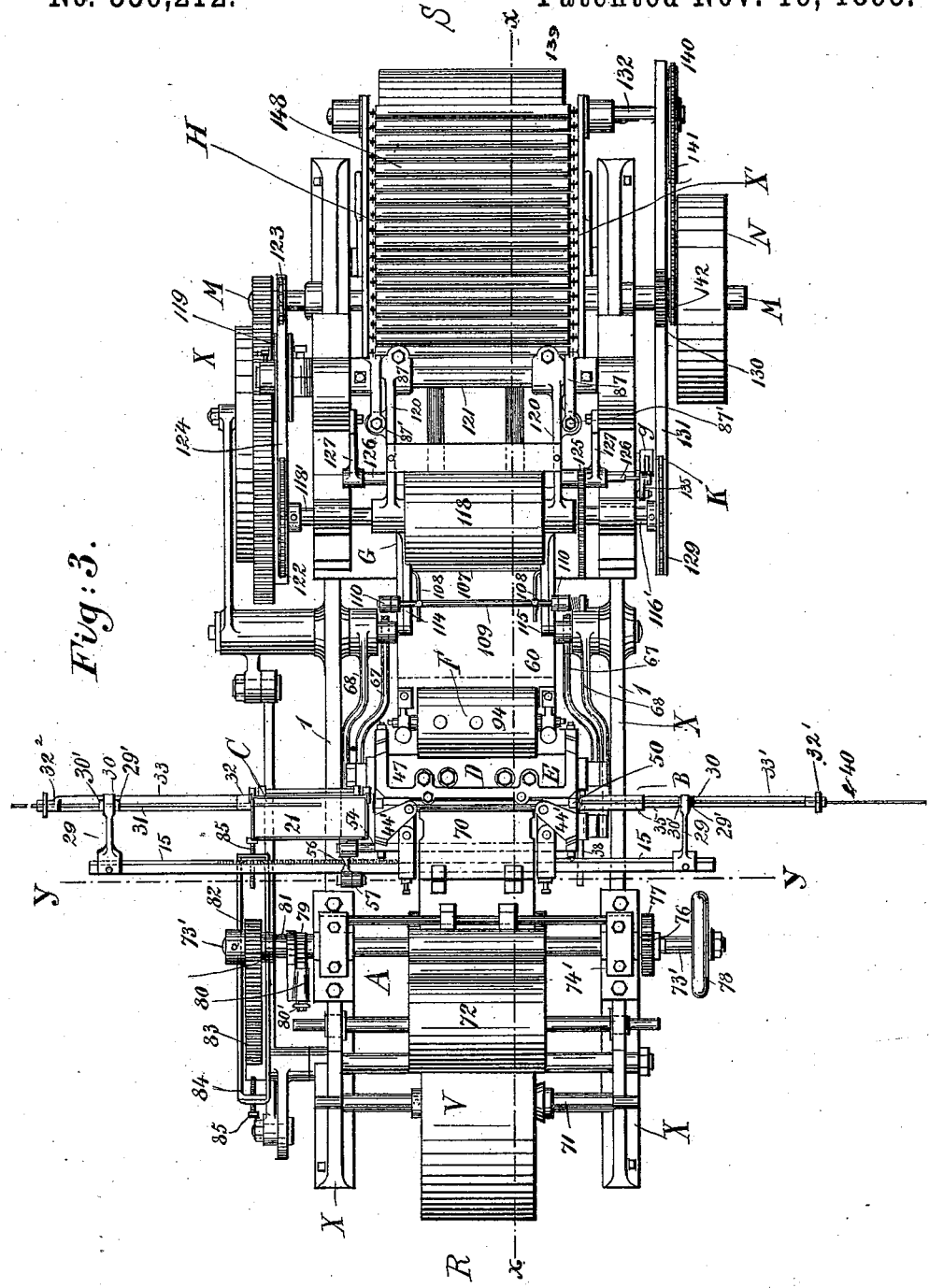

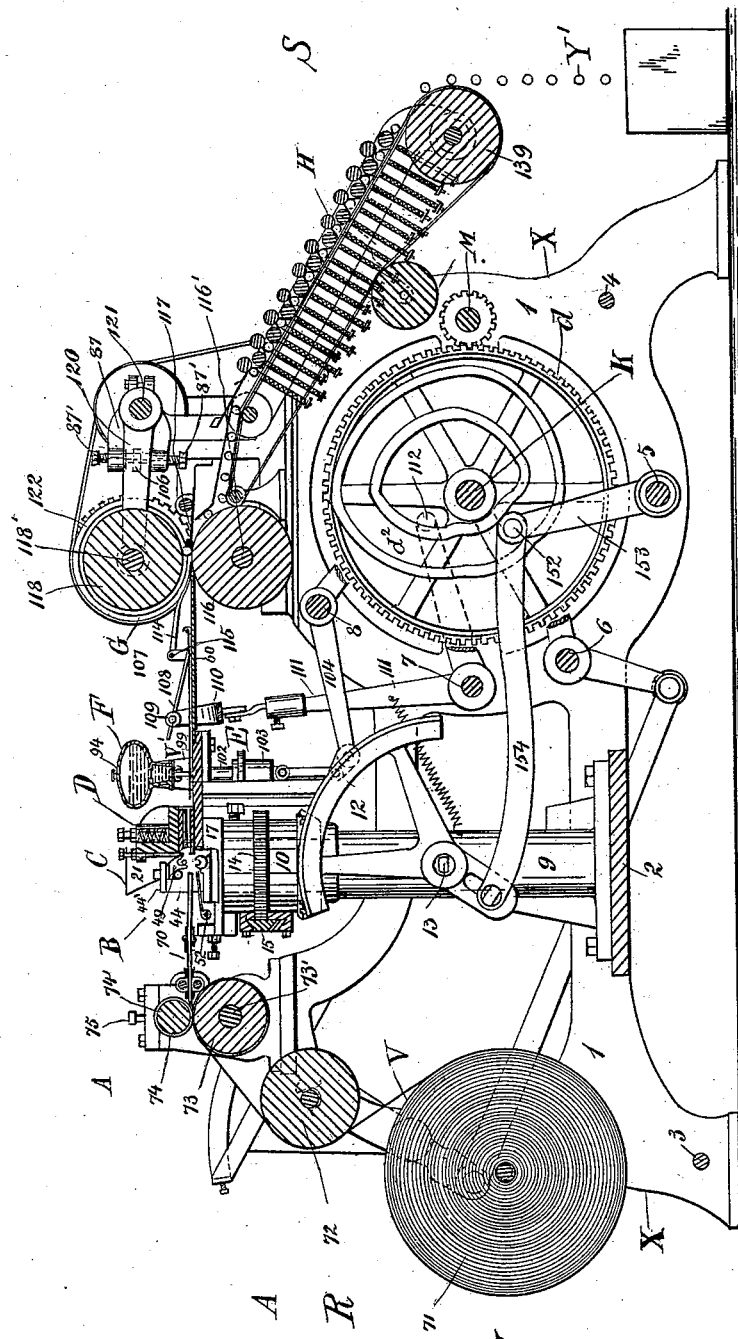

(No Model.) 13 Sheets—Sheet 5.
F. E. BLAISDELL.
MACHINE FOR MANUFACTURING PENCILS, &c.
No. 550,212. Patented Nov. 19, 1895.
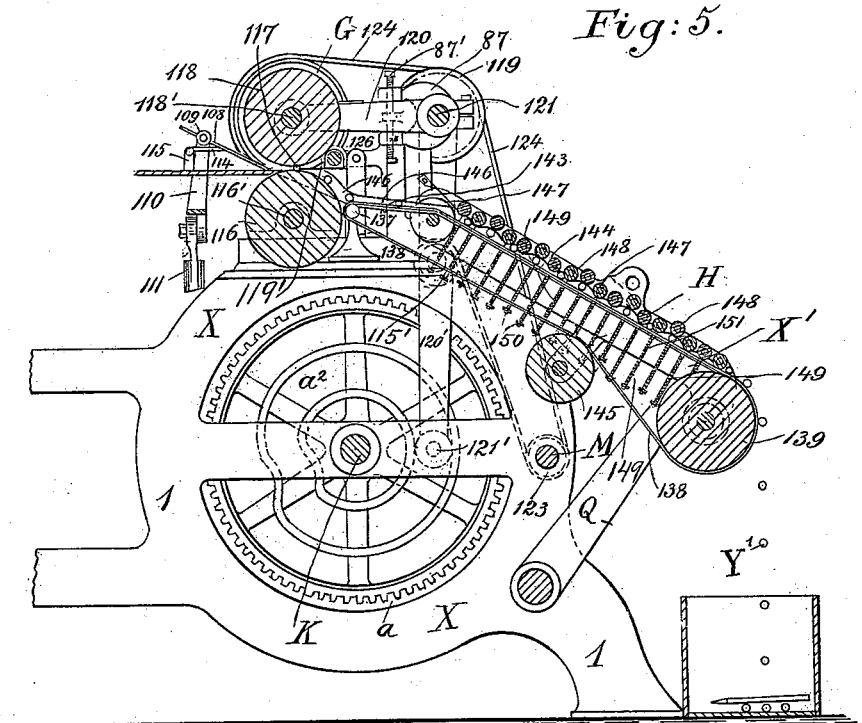
Fig: 5.
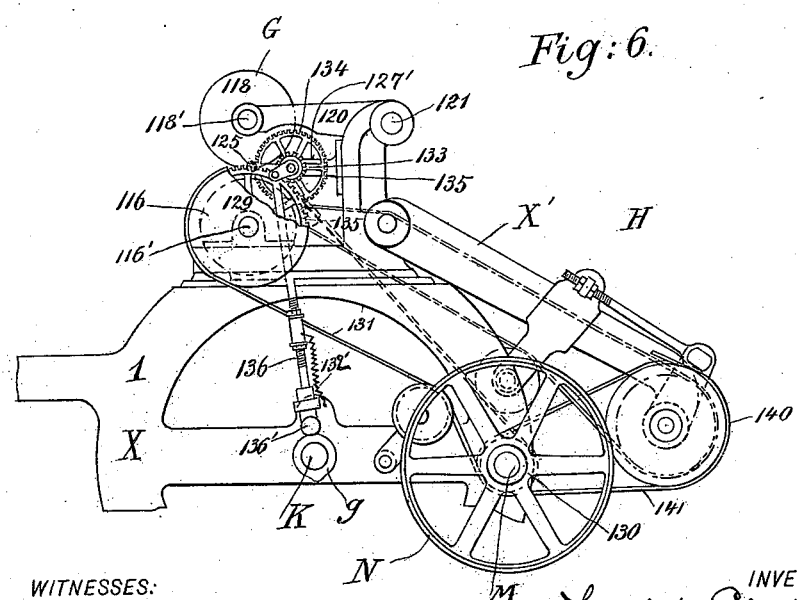
Fig: 6.
WITNESSES:
INVENTOR
Frederick Elijah Blaisdell
BY Clarence Ladd-Davis
ATTORNEY.

(No Model.) 13 Sheets—Sheet 6.
F. E. BLAISDELL.
MACHINE FOR MANUFACTURING PENCILS, &c.
No. 550,212. Patented Nov. 19, 1895.
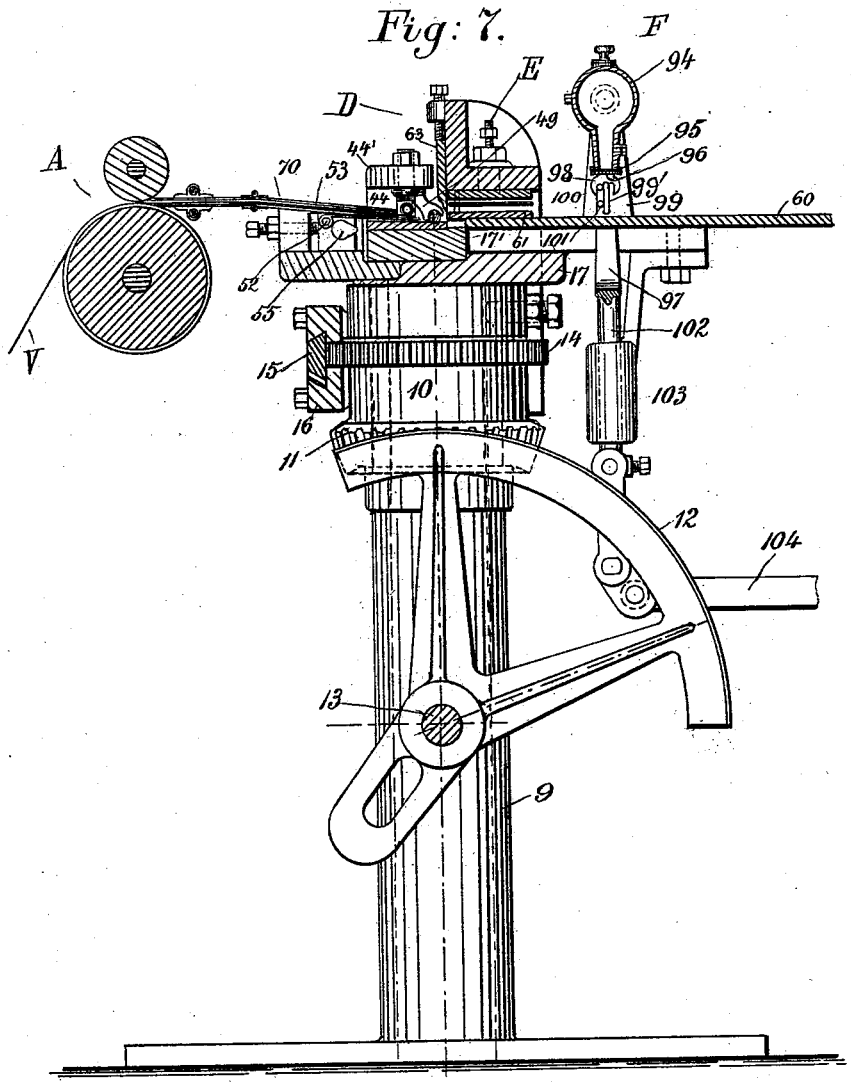
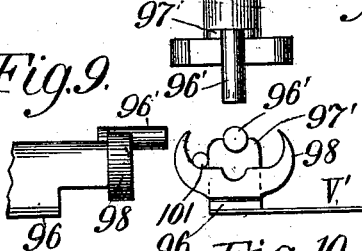
WITNESSES:
INVENTOR
BY
ATTORNEY.

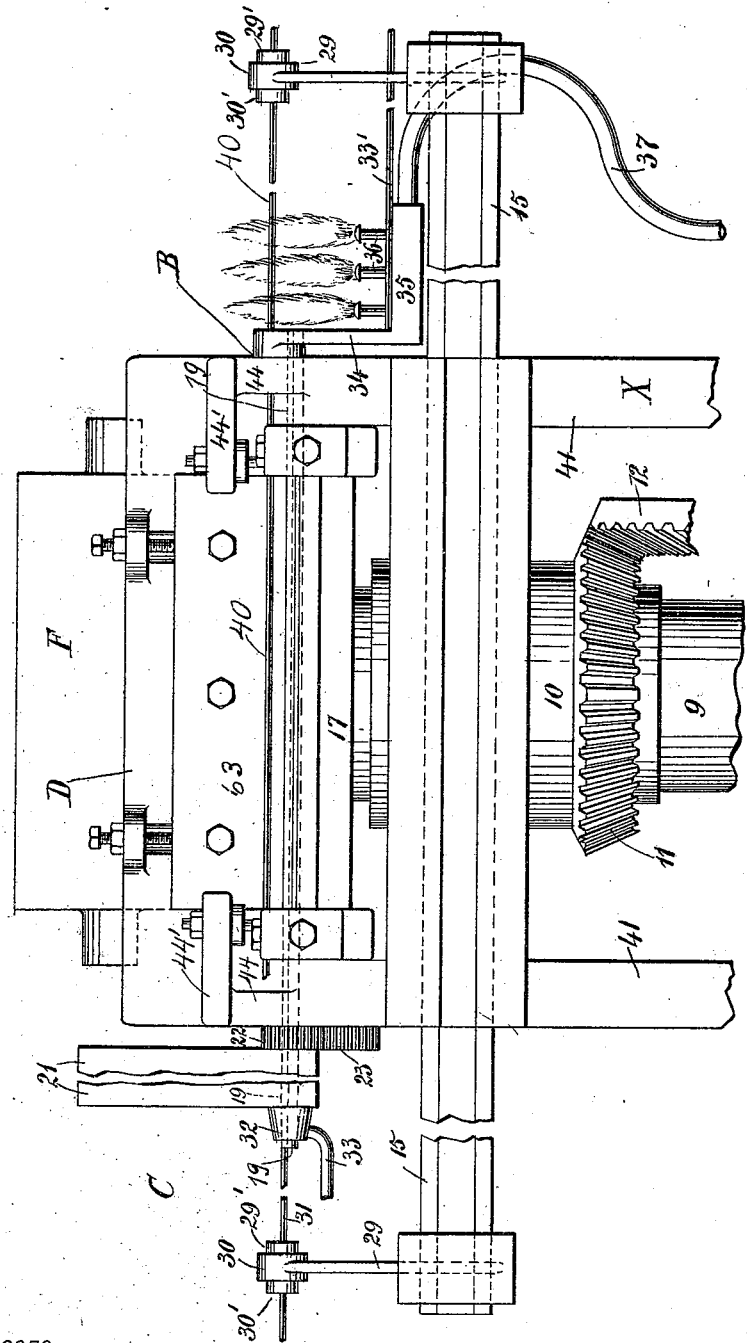

(No Model.) 13 Sheets—Sheet 8.
F. E. BLAISDELL.
MACHINE FOR MANUFACTURING PENCILS, &c.
No. 550,212. Patented Nov. 19, 1895.
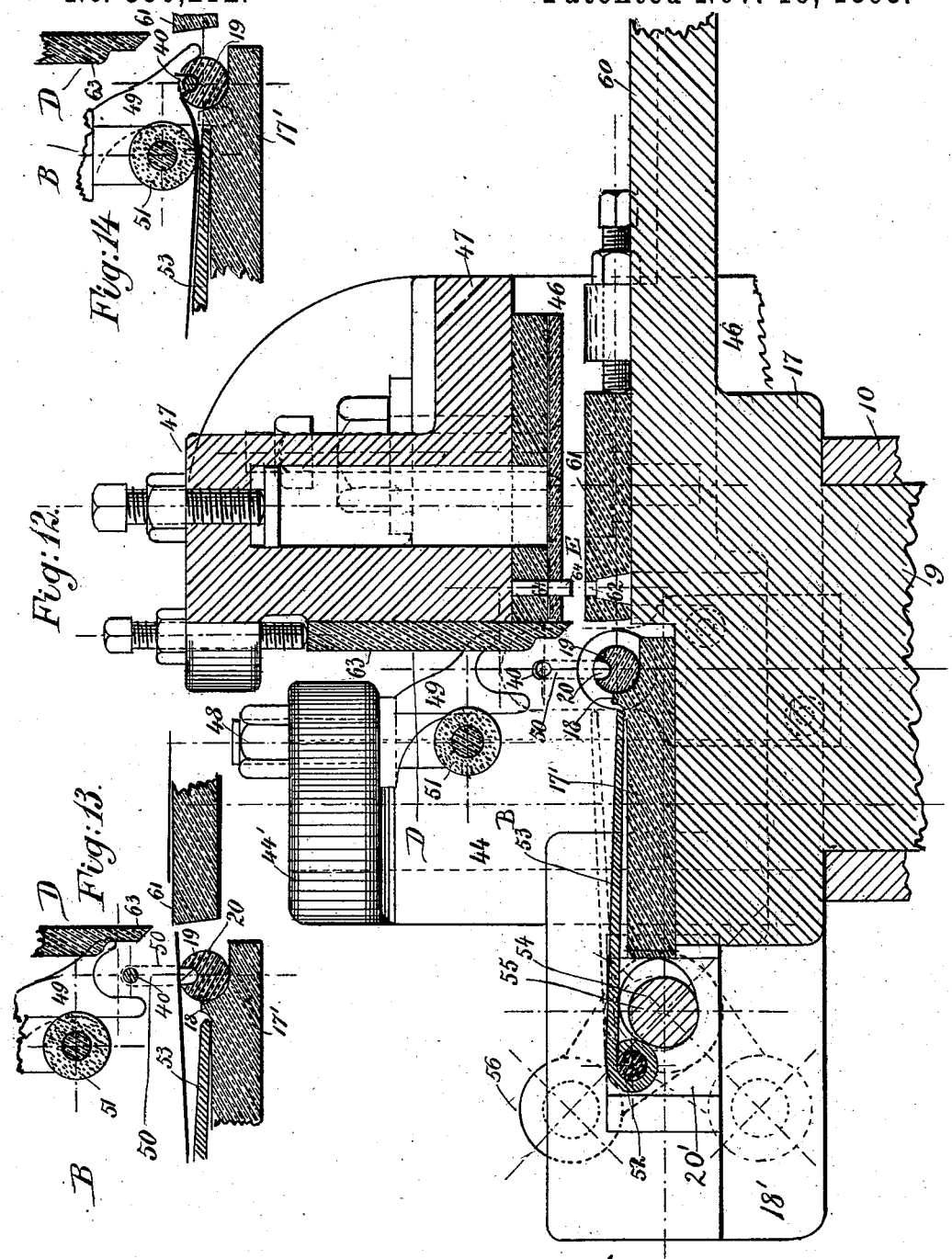
WITNESSES:
INVENTOR
Frederick Elijah Blaisdell
BY
Clarence Ladd-Davis
ATTORNEY.

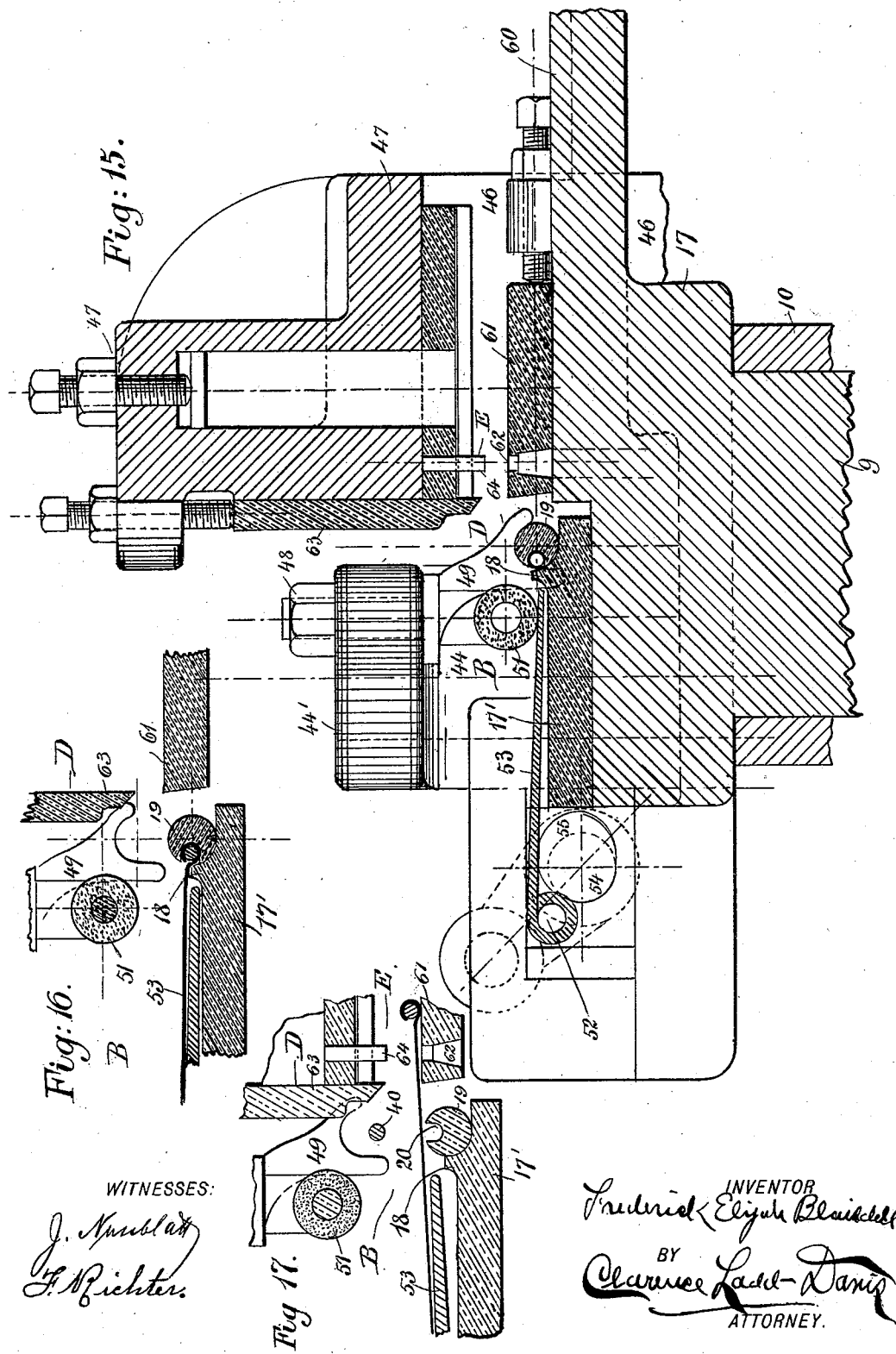

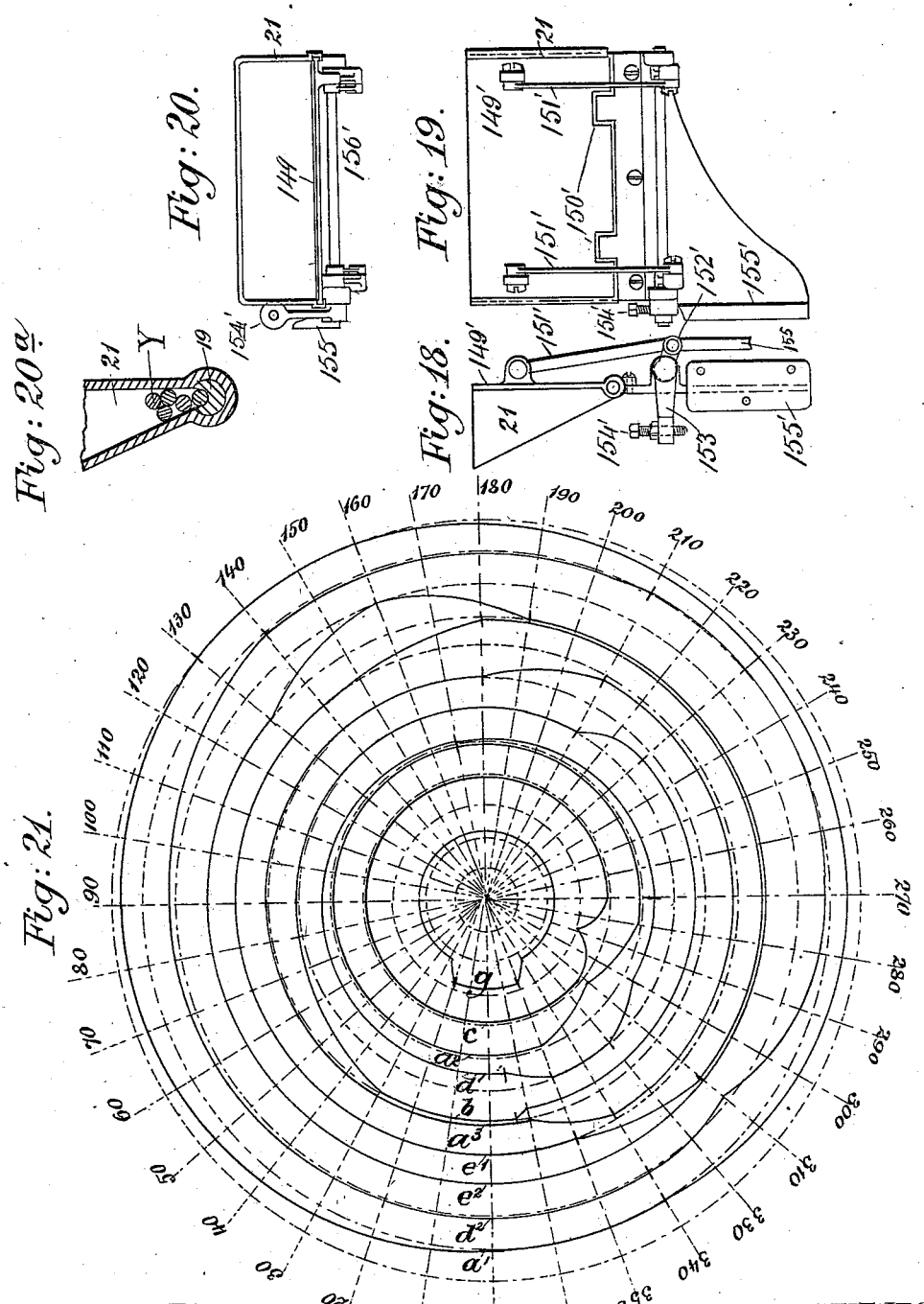

(No Model.) 13 Sheets—Sheet 11.
F. E. BLAISDELL.
MACHINE FOR MANUFACTURING PENCILS, &c.
No. 550,212. Patented Nov. 19, 1895.
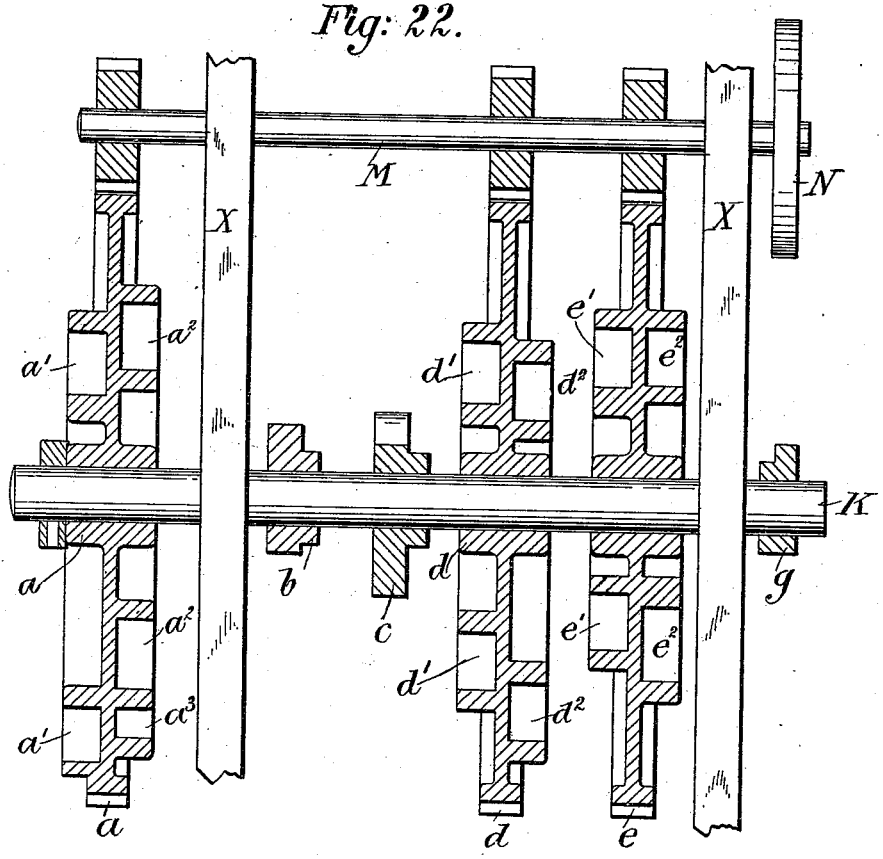
Fig. 22.
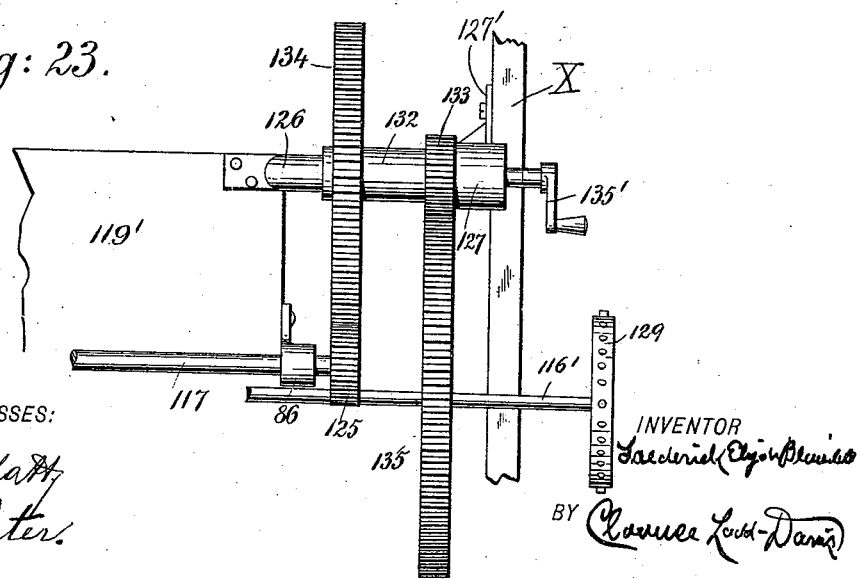
Fig. 23.
WITNESSES:
INVENTOR
BY
ATTORNEYS.

(No Model.) 13 Sheets—Sheet 12.
F. E. BLAISDELL.
MACHINE FOR MANUFACTURING PENCILS, &c.
No. 550,212. Patented Nov. 19, 1895.
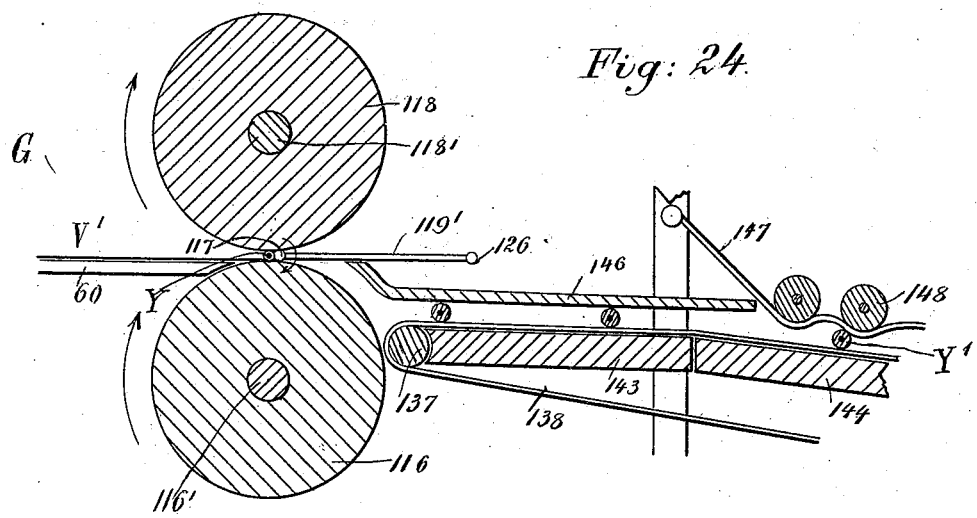
Fig: 24.
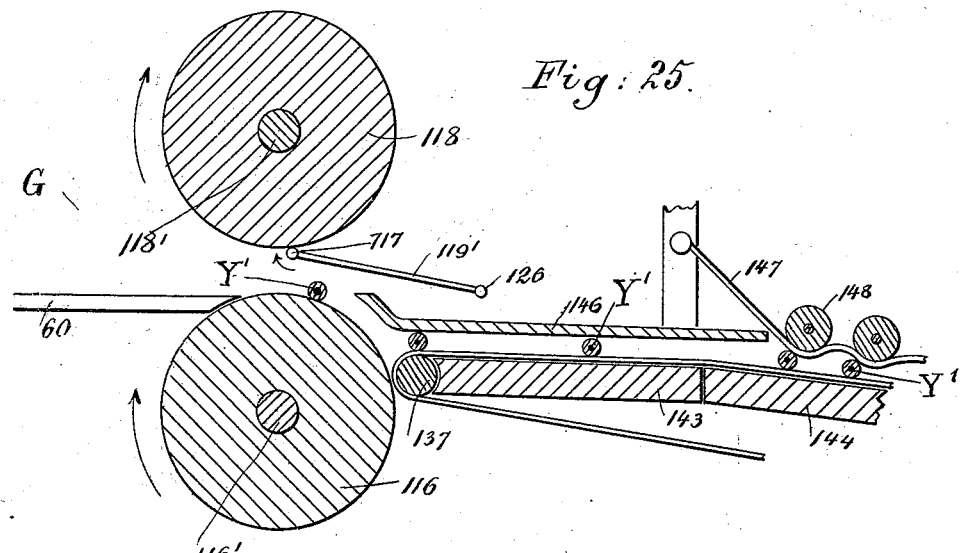
Fig: 25.
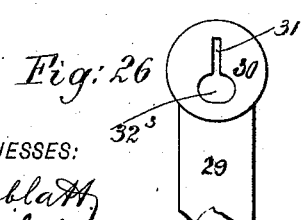
Fig: 26.
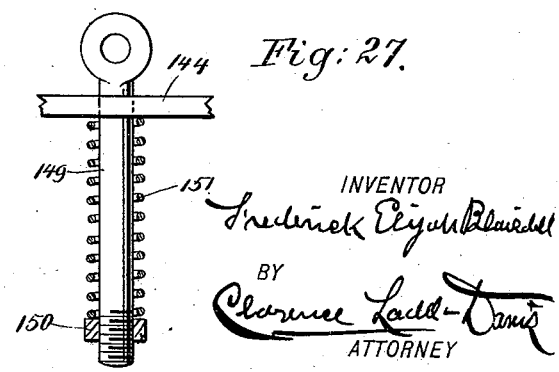
Fig: 27.
WITNESSES:
J. Nussblatt
J. F. Richter
INVENTOR
Frederick Elijah Blaisdell
BY
Clarence Ladd-Davis
ATTORNEY
ANDREW B.GRAHAM, PHOTO-LITHO. WASHINGTON, D.C.

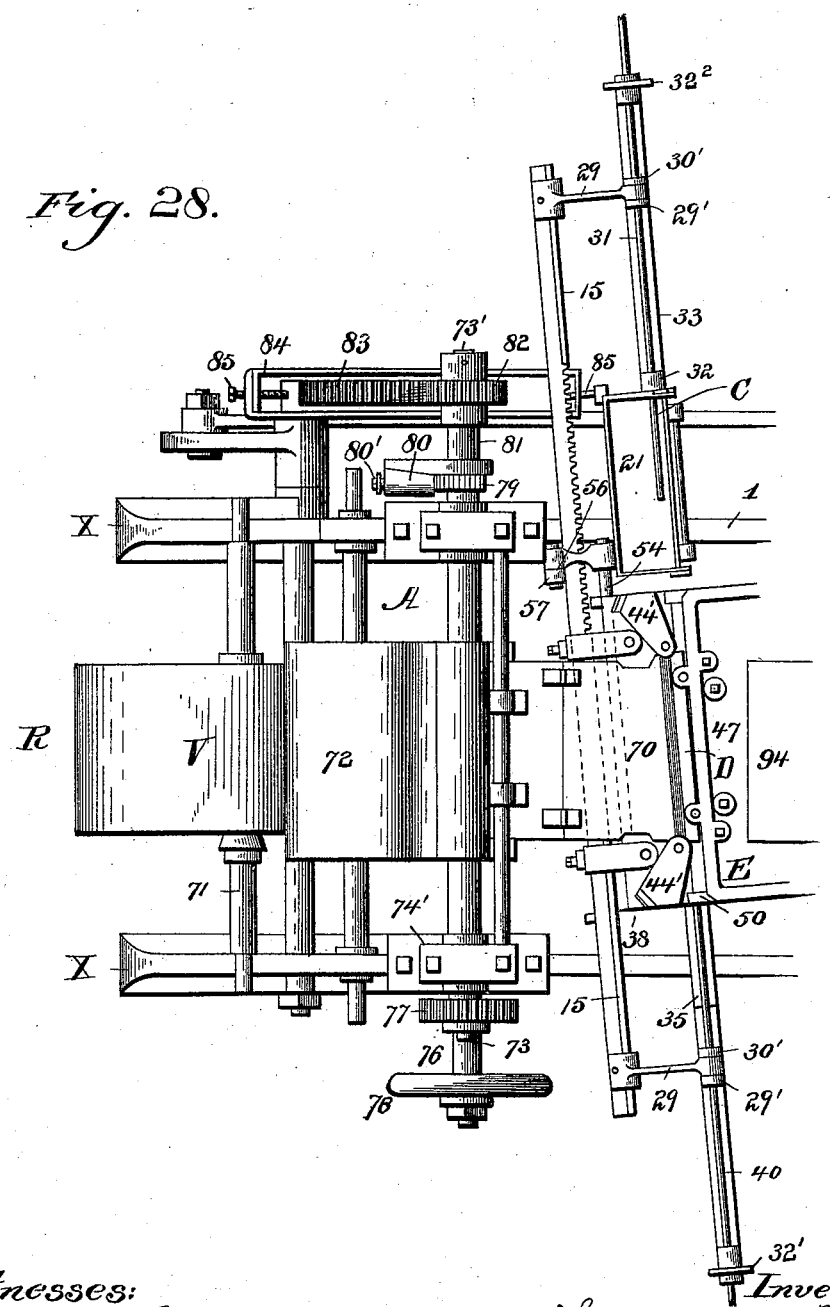

UNITED STATES PATENT OFFICE.

FREDERICK E. BLAISDELL, OF PHILADELPHIA, PENNSYLVANIA.

MACHINE FOR MANUFACTURING PENCILS, &c.

SPECIFICATION forming part of Letters Patent No. 550,212, dated November 19, 1895.

Application filed April 1, 1895. Serial No. 544,018. (No model.)

*To all whom it may concern:*

Be it known that I, FREDERICK ELIJAH BLAISDELL, a citizen of the United States, residing at the city of Philadelphia, in the county of Philadelphia and State of Pennsylvania, have invented certain new and useful Improvements in Methods of and Machines for Manufacturing Pencils, &c., of which the following is a specification, such as will enable others skilled in the art to which it appertains to make and use the same.

The objects of the invention are, first, to provide a new and improved method of manufacturing pencils of that particular form in which the marking-lead or crayon is inclosed in a covering formed of a sheet of flexible material rolled around such lead or crayon, and, second, to provide a new and improved form of machine for carrying such method into effect, and such method and machine are more particularly designed and adapted to be used in manufacturing pencils of the new and improved form described and claimed by me in United States Letters Patent No. 461,911, granted October 27, 1891, to me therefor.

The method of this invention consists, in substance, of the hereinafter-described method of forming pencils, wherein a sheet of suitable flexible material is provided with a series of weakened lines along which the same may be separated, forming a curl in such roll diagonal to the weakened lines, setting or making such curl permanent by heat or otherwise, and then rolling the rest of the sheet around the curl and securing the outer end of the sheet to the roll thus formed, a marking-lead or crayon being inserted in the curl at any stage of the process; and the machine of this invention is composed, in substance, of a paper-holding device, a paper-feeding mechanism, a curl forming and setting mechanism, a crayon-feeding mechanism, a paper-cutting mechanism, a paper-perforating mechanism, a pasting mechanism, a rolling mechanism, and a drying mechanism, and mechanism by which the materials are fed from one mechanism to another, although it is not to be understood that the invention or inventions are limited to a method or machine necessarily comprising at once all the steps or all the devices or mechanisms before mentioned, for the invention or inventions consist in certain various combinations or arrangements of such steps, devices, and parts and the construction of certain devices and parts, all substantially as hereinafter fully described, set forth, and claimed.

Such method and machine are fully shown and described in the following specification, of which the accompanying drawings form a part, wherein similar letters or numerals of reference designate like or equivalent parts wherever found throughout the several views, and in which the reference-letter R designates the front and S the rear end of the machine.

In said drawings Figure 1 is a side view, looking from the right, of my improved form of pencil-machine. Fig. 2 is a like view thereof looking from the opposite or left side of the machine. Fig. 3 is a top plan view thereof, and Fig. 4 is a side view thereof, looking from the right in section on the line $x$ $x$ of Fig. 3. Fig. 5 is a view in section similar to Fig. 4 of the rear portion of the machine, several of the moving parts being shown in a different position from that assumed by them in said Fig. 4; and Fig. 6 is a side view looking from the right of that portion of the machine shown in Fig. 5, certain portions being broken away in order to better show the mechanism. Fig. 7 is a side view, looking from the right, of the central standard of the machine and the forward portion of the mechanism of the machine, such mechanism being shown in section. Figs. 8, 9, and 10 are views in detail of the moving portion of the pasting mechanism. Fig. 11 is a front view, on an enlarged scale, of the upper forward portion of the machine in section on the line $y$ $y$ of Fig. 3; and Figs. 12 to 17, inclusive, are detail side views, in section, of the forward portion of the mechanism, showing the various positions assumed by such parts during the operation of the machine. Figs. 18, 19, 20, and 20ª are views in detail of the crayon box or receptacle, and Fig. 21 is a diagram showing the contour of the various cams or camways which are mounted upon and carried by the main shaft of the machine. Fig. 22 is a view of the main and driving shafts removed from the machine, the various cams and wheels having camways therein being shown in position thereon, the view being from the top. Fig. 23 is a top plan view of the gearing of the rolling mechanism. Fig. 24 is a side view in central section, on an enlarged scale, of the rolling mechanism, showing the position assumed by the parts and by the crayon and covering-strip at the commencement of the rolling operation; and Fig. 25 is a similar view of the mechanism shown in Fig. 24, showing the position assumed by the parts when the finished pencil Y' is delivered from the rolling device to the drying mechanism. Fig. 26 is a view in detail of the boss and arm which reciprocates the mandrel in one case and in the other the crayon-feeding rod. Fig. 27 is a view in detail of a portion of the drying mechanism; and Fig. 28 is a top plan view, on an enlarged scale, of the forward portion of the machine, showing the diagonal arrangement of the curl-forming, crayon-feeding, and paper-cutting and paper-perforating mechanism, the angle of diagonalty, in order to show the same plainly, being greatly exaggerated.

For convenience of description, that end of the machine into which the raw material is fed will be designated as the "front" R, and the other end, out of which issues the finished product of the machine, will be designated by the letter S and termed the "rear." That side of the machine which will be upon the right-hand of a person standing facing the machine at R will be termed the "right" side of such machine and the side opposite thereto and upon the left-hand of such person will be referred to as the "left" side thereof.

The improved form of pencil to be manufactured by the improved method and machine herein described, as set forth in the Letters Patent upon such pencil hereinbefore referred to, consists of a marking-lead or crayon inclosed in a covering formed of a sheet of flexible material bearing a series of weakened lines arranged diagonal to the axis of the roll, whereby the covering material may be stripped from the crayon, so as to uncover the same for use section by section, each of such sections when in place upon the crayon being substantially of the form of a conical helix. While not limiting myself to such material, I prefer to use what is known as "parchmentized" paper for such covering material for pencil-crayons or marking-leads; but in forming pencils therefrom I have experienced great difficulty in forming a tight roll of the covering-paper upon the marking-lead or crayon, and without being so tightly formed the pencil, while in a degree operative, will not be of first quality. I have discovered, however, after elaborate experiment, that in order to form a tight roll of the parchmentized covering-paper upon the crayon in each and every instance, the first turn or "curl" of the paper which lies next to and immediately incloses the crayon should be formed in the end of the sheet of covering-paper in such manner as to cause such curl to practically retain its form when released from the forming mechanism or other holding devices, and while I do not intend to limit myself thereto, I have discovered that the action of heat upon the paper of the curl, either during its formation or after it has been formed and while it is held in such curled position, well serves to render such curl of a permanent form, and I have also found that one good and efficient method of forming such curl in the covering-sheet is to form the same upon a heated mandrel or rod of substantially the same diameter as is the crayon or marking-lead which is to be inclosed therein; and I have found my improved form of pencil-machine herein described to be a good and efficient device for easily, cheaply, and quickly carrying such improved method of manufacturing pencils into effect and for manufacturing paper pencils of the improved form mentioned.

In the following specification the machine itself will be first described in all its parts, after which the operation thereof will be described, and the description of its operation will of necessity include a description of the improved method of manufacturing pencils, which, as well as said machine, I desire to protect herein.

Referring to the drawings, as shown in Figs. 1 to 4, inclusive, my improved form of pencil-machine consists of a suitable frame X, supported by which is a paper-feeding mechanism A, a curl-forming mechanism B, a crayon-feeding mechanism C, a paper-cutting mechanism D, a paper-perforating mechanism E, a pasting mechanism F, a rolling mechanism G, and a drying mechanism H, all of which are so constructed and arranged that the paper and crayons are automatically fed into the machine and from one portion of the mechanism to another by suitable devices or mechanisms in such manner as to render the process of manufacturing pencils automatic and continuous, the machine, after being once supplied with the required quantity of scored paper, crayons, and paste, and put in motion, needing no attention beyond that of supervision.

The various parts of the machine, except where otherwise explicitly stated, are preferably formed of suitable metal—such as iron, steel, and brass—and the supporting-frame X is formed preferably of two side-pieces 1 of cast-iron of substantially the shape shown, which are held in position about twenty-two inches apart by a suitable cross-piece 2 and by suitable cross-bars, shafts, or rods 3, 4, 5, 6, 7, and 8, which are secured to the side-pieces 1 in any desired manner, and such frame X so formed is preferably given greater rigidity by being bolted to the floor of the room where the same is to be operated.

The cross-piece 2 is located near the forward end R of the frame X, adjacent to the bottom thereof, and supported thereon and rigidly secured or bolted thereto is the main central standard 9 of the machine, which extends upward to or above the top of the frame X and serves as a support for the curl forming and cutting and perforating mechanisms B, D, and E, as shown in detail in Fig. 7.

Revolubly mounted upon the standard 9, so as to reciprocally rotate freely thereon, is a sleeve 10, provided with a gear 11, meshing with a sector or quadrant gear 12, which latter is pivotally secured to the standard 9 by means of a stud or pivot-shaft 13. Also secured to the sleeve 10, and preferably cast or otherwise formed integral therewith, as is also the gear 11, is a second gear-wheel 14, meshing with the rack-gear of a slide-bar 15, which slide-bar is preferably of the dovetail form shown and is held in a slide or way of similar shape formed in a cross-bar 16, supported in position across the frame X in any desired manner, preferably by having the ends thereof supported in the side-pieces 1 of such frame X.

As shown in detail in Figs. 12 to 17, inclusive, supported upon the top of the standard 9 is a table 17, on the top of which is in turn mounted a table-block 17', preferably of substantially the shape shown, and having extending across the same, adjacent to its rearward edge, an upwardly-extending rib 18, to the rearward of which rib and parallel therewith is formed in such table-block a groove or bearing of the form of a segment of a circle, in which rests, so as to freely rotate therein, the curl-forming-rod or die 19. This curl-forming rod or die 19 has formed in one side thereof the longitudinal curl-forming groove 20, which is of the rounded shape shown and of just sufficient size to hold therein the crayon of the pencil to be formed when such crayon is surrounded by a single thickness of the paper which is to be used to form the covering of such crayon, and, as shown in detail in Fig. 11, such rod or die 19 is of such length as to extend entirely across the table 17 and entirely through the bottom of the crayon box or receptacle 21. Rigidly secured upon such rod or die 19, preferably between the table 17 and the crayon-box 21, as shown in Fig. 11, is the gear-wheel 22, meshing with a sector or quadrant gear 23, which gear is rigidly mounted upon the end of a lever 24, (see Fig. 2,) which lever is pivoted to the frame X by means of a pivot or shaft 25, and such lever 24 is preferably of the form shown, the lower portion thereof being bent downward and being provided at its lower end with a cam-pin 26, by which such lever is actuated by the operation of the cam or camway $a^3$ on the wheel $a$, the upper end of such lever being kept normally in a depressed position by suitable springs 27 and 28, which are preferably secured to such lever and to the frame X, as shown in said Fig. 2, or such lever may be kept in such position in any other desired way.

As shown in Figs. 1, 3, and 11, the slide-bar 15 is of such length as to extend a considerable distance on each side of the frame X when in a central position, and to each end of such slide-bar is rigidly secured, in any desired manner, a suitable arm 29, provided at its upper end with a suitable boss 30, and through the particular boss 30, located on the left end of the slide-bar 15, passes the crayon-feeding rod 31, the inner end of which rod 31 is supported in and slides freely back and forth through a suitable hole formed in the end of a suitable supporting-head 32, mounted upon the supporting-rod 33, which head 32 is rigidly secured to the outer projecting end of the curl-forming rod or die 19 outside of the crayon-box 21, as shown in Fig. 11, in such manner that the rod 33 will form a crank for such rod or die 19, and the inner end of the crayon-feeding rod 31 is held in position at all times in the curl-forming groove 20 of the curl-forming rod or die 19.

Rigidly secured to the other or right end of the curl-forming rod or die 19 on the right side of the frame X is a crank-shaped piece of metal, what may properly be termed the "handle portion" 35 thereof being provided with an interior gas-chamber having any suitable number of burners 36 connected therewith for heating the mandrel 40, which chamber and burners are supplied with gas through a flexible pipe 37 in the well-known manner, and secured at the end to such burner or handle portion of said crank is a supporting-rod 33', similiar to the rod 33 on the opposite side of the machine, which rod 33', as shown in Fig. 3, is provided at its outer end with a supporting-head 32', similar to the head $32^2$ on the left end of the supporting-rod 33, and through this head 32' passes, so as to be supported thereby and reciprocate easily therethrough, the outer end portion of the curl-forming mandrel 40, which also passes through the boss 30, secured to the arm 29, secured to the right end of the slide-bar 15, in the same manner as does the crayon feeding-rod 31 through the similar boss on the other or left end of the slide-bar 15. Rigidly secured to the rod 31 and curl-forming mandrel 40, preferably by means of suitable set-screws (not shown) upon one side of each of the bosses 30, are suitable stops 29', preferably of substantially the shape shown, and secured upon such rods on the other or opposite sides of each of such bosses, such a distance from the said stops 29' as to allow of the free play of the rods in slot 31', are similar stops 30', and by this arrangement, while the rod 31 and mandrel 40 may be drawn in and out by the movement of the slide-bar 15, such rods can freely play up and down in an easy manner in the slot 31', with which each of the bosses 30 is provided, and while such slot 31' must in each case be of such shape as to permit of the free rotation and movement of the rods 31 and 40 therein during the partial rotation of the rod or die 19, and also in the case of the mandrel 40, to allow of upward movement thereof when lifted from the curl-forming groove 20 of such die 19, and may be of any shape that will permit of this, still I prefer to form the slots 31' of the shape shown in detail in Fig. 26, in which such slot is provided with an enlarged circular bottom portion $32^3$.

For the purpose of normally forcing the mandrel 40 upward out of the curl-forming groove of the rod or die 19, such mandrel rests in a suitable perforation formed in the end of a pivoted lever 38, Figs. 1 and 3, the end carrying the mandrel being kept normally pressed upward by a suitable spring 38' and the mandrel being unerringly directed into the groove of the die 19 by a suitable slotted guide-plate 50, secured in position in any desired manner, as shown in full lines in Fig. 3 and in dotted lines in Figs. 12 and 13. On either side of the table 17 and preferably formed integral therewith are downwardly-depending side pieces 41, Figs. 1, 2, and 11, in each of which, on the outer side, are formed two suitable perpendicular slideways 42 and 43, in the forward pair 42 of which reciprocate easily up and down a pair of suitable slide-bars 44, preferably provided at the top with the backwardly and inwardly projecting wing-pieces 44', Figs. 3, 4, 12, and 15, which are formed integral therewith or are secured thereto in any desired manner, and reciprocating in like manner up and down in the ways 43 are substantially-similar slide-bars 46, which are connected one with another by a cross-bar 47, secured thereto in any desired manner, which cross-bar 47 is in cross-section preferably of substantially the shape shown in Figs. 12 and 15.

Located on the inner side of each of the slide-bars 44 and secured, preferably, to the wing-pieces 44', by means of suitable bolts and nuts 48, are fingers 49, preferably of the form shown in Figs. 12 to 17, the office of which fingers is to force the mandrel 40 down into the curl-forming groove 20 of the curl-forming rod or die 19, and revolubly journaled in the slide-bars 44, immediately forward of the fingers 49, is a tension-roller 51, which is preferably provided with a covering of soft rubber or other yielding material, as shown.

Supported at each end in the forwardly-extending side pieces 18' of the table 17 or in a block 20' sliding in suitable ways formed in the table, as shown in detail in Figs. 12 and 15, is a rod or shaft 52, upon which is movably supported or journaled the forward end of a lifting-plate 53, which extends rearward from its supporting-shaft to the rib 18 of the table-block 17', so as to fill the space on top of such table-block lying forward of such rib 18, as shown in Figs. 12 to 17, inclusive, and extending across the machine from side to side thereof, and revolubly supported in suitable journals beneath the lifting-plate forward of its supporting-shaft 52, is a shaft 54, on which is rigidly secured a lifting-cam 55, by which, when the shaft 54 is partially rotated to the left, the rear free end of the lifting-plate 53 will be lifted up into the position shown in Fig. 17 and in dotted lines in Fig. 12, such lifting-plate being normally held by gravity in the depressed position shown in full lines in Figs. 12 to 16, inclusive, and for the purpose of actuating the cam 55, so as to lift the plate 53, the shaft 54 is provided at the left end thereof with a crank 56, to the pin of which is secured a suitable connecting-rod 57, Fig. 2, in connection at the lower end with a lever 58, pivoted upon a shaft or stud 8', secured to the frame X, and provided at the other end with the cam-pin 59.

Secured to the rearward side of the table 17 is the main table 60 of the machine, which extends rearward from the table 17 to the rolling mechanism G and covers the larger forward portion of the top of the under or lower roller thereof, as shown, and such main table 60 is supported in position in any desired manner, preferably by being secured to the frame X in any convenient way. Also supported in any convenient manner in the position shown in Figs. 12 to 15, inclusive, upon the table 17, is a combined knife and punch die-block 61, which is provided with a forward cutting-edge and with suitable holes or female dies 62, which extend in a line clear across the block 61, and are about one-sixteenth of an inch in diameter and about the same distance apart from one another, and located above such die-block, and secured to and carried by the reciprocating cross-bar 47, are a knife 63 and also a series of punches or male dies 64, the knife registering with the forward cutting-edge of the die-block 61, so as to form, in connection therewith, a shearing device, and the punches or male dies 64 being similar in number and registering with the holes or female dies 62 when the cross-bar 47 is forced downward so as to cause such punches or male dies 64 to enter the holes or female dies 62. Such knife, dies, and die-block are all secured in position in any desired manner, and are preferably provided with suitable adjusting-screws, as shown.

Secured to the reciprocating slide-bars 43 and 44, Figs. 1, 2, and 3, are suitable actuating connecting-rods 65 and 66, which are preferably formed of two pieces joined together by a suitable turnbuckle, by which the length of such rods may be regulated as desired. Connected by a suitable pivot-joint with the lower end of each of the connecting-rods 65 is a lever 67, which is rigidly secured at its rearward end to the shaft 6, which is mounted in suitable bearings in the frame X, so as to be at least partially and reciprocally rotatable therein, and secured in like manner to the lower ends of each of the connecting-rods 66 is a similar lever 68, which is rigidly secured at its rearward end to the shaft 7, which is mounted in suitable bearings in the frame X in the same manner as is the shaft 6. Rigidly secured to the shaft 6 and projecting rearward therefrom is a lever 64', provided with a suitable cam-pin 68', and rigidly secured in like manner to the shaft 7 and extending rearward therefrom is a similar lever 65', having at its rearward end a suitable cam-pin 69, which levers 64' and 65' are moved so as to partially rotate the shafts 6 and 7 and thus cause reciprocation of the slide-bars 43 and 44 by the action of their respective cam-pins 68' and 69 of the cams or camways $e'$ and $e'$, which are formed integral with and located upon opposite sides of the cog-wheel $e$, which is mounted upon the main shaft $k$ of the machine, as shown in detail in Fig. 22.

Situated forward of the lifting-plate 53 and supported in such position in any desired manner are guide-plates 70, Figs. 3, 4, and 7, preferably formed of thin brass or other suitable sheet metal, supported a short distance apart and one above the other, which serve as guides to guide the paper from the feed-rolls to the curl-forming mechanism.

The suitably scored or weakened paper to be used as the crayon-covering is usually in the form of a roll of the width of the length of the pencil to be formed, and this roll is supported upon a rotatable shaft 71, mounted in suitable bearings in the forward portion of the frame X, and from thence the strip of paper from such roll passes rearward over a suitable guide-roll 72 and between feed-rolls 73 and 74, and through the guide-plates 70 to the curl-forming rod or die 19.

As shown in Figs. 1, 2, and 3, the lower feed-roll 73 and the upper feed-roll 74 are mounted upon suitable shafts 73' and 74', which are revolubly mounted in suitable journal-boxes formed in or supported by the frame X, and such rolls are each preferably covered with soft rubber or other suitable yielding material, and are kept pressed together, so as to feed forward the paper when rotated, by suitable set-screws 75, and such feed-rolls are made to rotate in unison by suitable gear-wheels 76 and 77, secured to such shafts and meshing one with another, as shown, and such gear-wheels 76 and 77, as well as the hand-wheel 78, which is preferably secured to the shaft 73' of the lower roll 73 for the purpose of rotating the feed-rolls by hand when desired, are all preferably located upon the right side of the machine, while secured to the shaft 73 upon the opposite or left side of the machine is a suitable ratchet-wheel 79, adapted to be rotated in a forward direction by the action of a suitable spring-pawl 80, Fig. 3, which pawl is mounted upon and rigidly secured to a sleeve 81, revolubly mounted upon the projecting end of the shaft 73', upon which sleeve 81 is also rigidly mounted a gear-wheel 82, meshing with a sector or quadrant gear 83, pivotally supported upon a pivot or shaft 83', secured to the frame X of the machine. The sector or quadrant gear 83 preferably vibrates back and forth in a suitable frame 84, which is secured to the frame X and is provided at the forward and back ends with suitable set-screws 85, by which the forward and backward movement of such sector or quadrant gear are limited, inasmuch as the construction is such that the ends of the said gear 83 abut against such set-screws, and by this arrangement any liability to a difference in the length of the feed caused by the sector-gear springing by reason of an increase in speed is obviated, and the feed can be made unerringly the same irrespective of the speed at which the machine is operated.

The spring-pawl 80 is preferably of such form of construction that by turning the milled head-nut 80' thereof the pawl will be locked in a retracted position and out of engagement with the teeth of the ratchet-wheel 79, so that the vibration of the sector or quadrant gear 83 and consequent reciprocatory rotation of the sleeve 81 will in such case fail to cause any rotation of the shaft 73'; and in such case, although all the other moving parts of the machine will be in operation, the feed-rolls will remain at rest and no paper will be fed to the machine thereby. Inasmuch, however, as the particular form of ratchet used is well known and forms no part of my invention, I have not deemed it necessary to show or describe in detail herein the construction thereof.

The lower projecting end of the quadrant or sector gear 83 beyond the pivot is provided with a suitable slot 88, through which passes a pin 89, by which the forward end of a connecting-rod 90 is adjustably connected with such gear 83, and such rod 90 is connected at its rear end with a lever 91, rigidly secured to a sleeve 91', which is pivotally mounted upon the projecting end of the shaft 6, and rigidly secured to such sleeve is a rearwardly-extending lever 93, provided at its rearward end with a suitable cam-pin 93' in operative connection with the cam or camway $a'$, formed on the outer side of the cog-wheel $a$, which is rigidly recured upon the left end of the main shaft K of the machine.

Located above the main table 60 of the machine, immediately rearward of the cutting and perforating mechanism E, is the pasting mechanism F, which is of such construction as to automatically deposit the required quantity of paste, glue, or other suitable adhesive substance upon the rear end of the strip which is to form the covering of the marking-lead or crayon of the pencil, when such strip of paper is stopped in the proper position beneath the same to receive such paste. Such pasting mechanism may be of any desired form, usually of that shown, consisting of a paste-reservoir 94, located above and extending across the table 60 and provided with a perforated or porous bottom piece 95, through which the paste, glue, or other adhesive material used is allowed to percolate, and is received upon a paster-bar 93, (see Figs. 1, 7, 8, 9, and 10,) which bar is preferably covered with rubber, felt, or other suitable soft substance adapted to receive the paste or adhesive substance. The paster-bar 96 is pivoted at the ends in a suitable fork 97, the pivots 96' being located at the ends of short side bars 97, and at one end of said paster-bar, and preferably secured to one of the side bars 97', is a fork-cam 98 of substantially the shape shown in detail in Figs. 7 and 10, and secured in proper position to actuate the fork-cam 98 when the paster-bar is moved by the action of the fork 97, preferably by being inserted in suitable holes in one of the standards 99, which support the paste-reservoir 94, are two pins 100 and 101, located in such a position and such a distance apart as to enter the fork of the cam 98 and cause the paster-bar to be inverted and forced into the position shown in Fig. 10, so as to deliver the paste upon the paper sheet V' lying on the main table 60 of the machine whenever such paster-bar 96 is forced downward by the movement of the fork 97 in which the same is pivoted and to return same to position shown in Fig. 7 on the upward movement of the fork, and this fork has its lower cross-bar beneath the table provided with a suitable standard or slide-bar 102, which reciprocates back and forth in a suitable slide-bearing 103, which bar 102 is connected in a suitable manner by a pivot-joint with a link attachment, as shown, with a lever 104, which is pivoted upon the shaft 8, and is preferably of the bent form shown, and provided at its rearward end with a suitable cam-pin 105, Fig. 1, adapted to be actuated by the paster-cam c, which is rigidly mounted upon the main shaft K, as shown in Fig. 22; and in order to make the path of the vertical reciprocation of the paster-bar 96 perfectly straight the end pivots thereof, before entering their journal-bearings in the end of the fork 97 pass through suitable guiding-slots 99' in the supports 99, in which the same rotate freely while kept to a straight vertical path.

Located above the main table 60 immediately in the rear of the pasting mechanism is the carrier feed-bar 107, Fig. 1, which extends across the main table of the machine, and is provided adjacent to each end with a forwardly and upwardly extending side bar 108, the forward ends of which side bars are secured rigidly to a suitable cross-bar 109, which cross-bar is pivotally supported at the ends in the upward extensions of a fork 110 of similar construction to the fork 97, the central portion of the cross-bar of this fork 110 being provided below the main table with a lever 111 of the bent form shown in Fig. 4, which lever is pivotally mounted upon the shaft 7, and is provided at its rearward end with a suitable cam-pin 112 in actuating connection with the cam or camway d', formed in one side of the wheel d, which is mounted upon the main shaft K.

As shown more plainly in Fig. 3, the side bars 108 are connected with the carrier feed-bar 107 some little distance—say, an inch or so—inward from the ends thereof in such manner that when the carrier feed-bar is pushed toward the rolling mechanism the ends of such bar 107 will pass under and lift up the rearwardly-extending free ends of the gravity-bars 114, which are loosely pivoted at their forward ends to suitable supports 115, which supports are far enough apart to allow the carrier feed-bar 107 to pass rearward between the same. As soon as the carrier feed-bar 107 has passed rearward from beneath such gravity-bars 114, which are provided with a rearward knife-edge, which lies close against the main table, such gravity-bars fall down upon the table, and as soon as the carrier feed-bar 107 is carried toward the front of the machine the extending ends of such bar will ride up over such gravity-bars 114 until the extreme forward ends thereof are reached, when such carrier feed-bar 107 will fall by gravity down behind such gravity-bars into its extreme forward position, which is slightly more forward than that shown in Fig. 4.

Located to the rear of the carrier feed-bar 107 is the rolling mechanism G, by which the sheet of paper in which the curl has been formed by the curl-forming mechanism, in which curl the crayon has been deposited by the crayon-feeding mechanism and upon the extreme rear end of which the paste or other adhesive substance has been deposited by the pasting mechanism, is rolled tightly around the crayon. This rolling mechanism G may be of any desired construction, but is preferably of that shown, consisting of a bottom roll 116, a middle or back roll 117, and a top roll 118, all arranged substantially as shown. The top roll 118 and the bottom roll 116 are preferably of substantially the same diameter and are mounted upon suitable shafts 116' and 118', respectively, while the middle or back roll 117 is of extremely small diameter compared with that of the other rolls, being in reality a slender steel roll of little, if any, larger diameter than that of the crayon of the pencil to be formed, and the back of this slender steel roll rests against and is kept from bending backward by abutting against the forward grooved edge of a thin back plate 119', as shown in detail in Figs. 24 and 25, which plate, as shown in Fig. 23, has secured at either end thereof a suitable journal box or bearing 86, in which the roll 117 is journaled so as to rotate easily therein, and rigidly mounted upon the projecting end of such roll 117 on the right side is a suitable gear-wheel 125. The back plate 119' is provided at its back edge at either end with suitable pivots or shafts 126, which are revolubly or movably supported, so as to allow of vibration of the plate 119' in suitable journal boxes or bearings 127, supported in position in any desired manner, preferably by suitable standards 127', secured to the frame X immediately in the rear of the rolls.

The shaft 118', upon which is rigidly mounted the upper roll 118, as shown in Figs. 1, 2, and 3, is revolubly mounted at the ends in suitable journal boxes or bearings formed in the forward ends of suitable levers 120, the rearward ends of which levers 120 are mounted upon a shaft 121, which is revolubly or movably mounted in suitable journal-boxes formed either in the frame X or in an upward extension thereof. The levers 120 are rigidly secured to the shaft 121, and to facilitate adjustment of the roll 118 there are also secured to such shaft, adjacent to each of the levers 120, suitable adjusting devices 87, of a U shape, as shown in Fig. 4, the shaft 121 passing through the bottom portion of the said U and the top or open portion extending toward the front and being provided above and below with adjusting-screws 87', abutting against suitable adjusting-fins 106, formed integral with each of the levers 120. By this arrangement it will be seen that such adjusting U's being rigidly secured to the shaft 121, if the set-screws or keys (not shown) which secure the levers 120 to such shaft are loosened, that such levers may be adjusted upon such shaft, while the same is held stationary, by manipulation of the adjusting-screws 87' in such manner as to raise or lower the roll 118, and such shaft 121 is actuated by a downwardly-depending lever 120', which is secured to such shaft, preferably at the left end thereof, as shown in Figs. 2 and 5, which lever is provided at its lower end with a suitable cam-pin 121', which is in actuating engagement with a suitable cam or camway $a^2$, formed on the inner side of the wheel $a$, which is rigidly mounted upon the main shaft K, as shown in Fig. 22.

Mounted upon and rigidly secured to the shaft 118' on the left side of the frame X, as shown in Fig. 2, is the sprocket-wheel 122, which is in actuating connection with a similar sprocket-wheel 123 by means of a suitable sprocket-chain 124, which sprocket-wheel 123 is rigidly mounted upon the driving-shaft M, which is revolubly mounted in suitable journal boxes or bearings in the frame X. In order that the sprocket-chain 124 may be kept at all times taut during movement up or down of the upper roll 118, the upper run of such sprocket-chain passes over an idler-pulley 119, revolubly mounted upon the shaft 121, and the under run of such chain passes back to the sprocket-wheel 122 over a similar idler-pulley 115', which is revolubly mounted upon a suitable stud or pivot secured to the lever 120.

Rigidly mounted upon the end of the shaft 116' of the bottom roll 116, which shaft is revolubly journaled in the frame X on the right side of such frame, is a sprocket-wheel 129, connected by a suitable sprocket-chain 131 with a sprocket-wheel 130, which is rigidly mounted upon the driving-shaft M.

As shown in detail in Fig. 23, revolubly mounted upon that portion of the pivot-shaft 126 lying between the journal-box 127 and the back plate 119' on the right side of the machine is a sleeve 132, upon which is rigidly mounted a small gear-wheel 133 and a larger gear-wheel 134, the latter of which is upon the inner end of such sleeve, and such gear-wheel 134 meshes with the small gear-wheel 125, which is upon the end of the middle or back roll 117, and the gear-wheel 133 meshes with a suitable gear-wheel 135, which is rigidly mounted upon the shaft 116' of the lower roll 116.

Rigidly secured to the end of the pivot-shaft 126, upon which is mounted the sleeve 132, is a crank 135, to the pin of which is pivotally secured the upper end of a connecting-rod 136, which is provided at its lower end with a suitable cam-pin 136' in actuating connection with the cam $g$, which is mounted upon the main shaft K, and being kept permanently in contact therewith in any desired manner, preferably by a suitable spring 132'.

Immediately in the rear of the rolling mechanism G is the drying mechanism H, which is preferably of the construction shown in Fig. 5, consisting of a revoluble shaft 137, supported in suitable bearings extending across the machine immediately in the rear of the lower roll 116 at about the center thereof, over which shaft 137 passes a suitable endless traveling apron or belt 138, to which motion is transmitted by a suitable driving-roll 139, which is revolubly mounted in the lower rear end of an extension X' of the frame X, which driving-roll receives motion from a suitable sprocket-wheel 140, mounted on the shaft thereof, which is in communication with a sprocket-wheel 142, mounted upon the driving-shaft M by means of a suitable sprocket-chain 141. The forward end of the frame X' is much higher than the rear end thereof, and the forward end is preferably pivotally supported below the shaft 121 in substantially the same horizontal plane as the shaft 116', and the rear lower end is supported upon suitable braces Q, Fig. 5, bolted thereto at the upper end, either the frame X' or such braces Q being preferably provided with upright slots, (not shown,) whereby the rear lower end of such frame X' may be made vertically adjustable.

Suitably supported immediately in the rear of the shaft 137 and beneath the upper run of the traveling apron or belt 138 is a suitable plate or table 143, which extends backward until it abuts against a similar table or plate 144, supported by the frame X' and extending from the upper end thereof to the top and center of the driving-roll 139 and, for the purpose of keeping the traveling apron 138 at all times taut an idler or mule pulley 145 is preferably adjustably mounted beneath the under run thereof, as shown, and by the vertical adjustment thereof such apron may be kept at all times taut.

Supported in any suitable manner in the rear of the bottom roll 116, above the upper run of the traveling apron 138, which travels downward when in motion, and immediately behind the middle or back roll 117, with the forward end thereof in contact with the back plate 119' when the same is in the position shown in Fig. 24, and with the rear end thereof abutting against the under side of the upper portion of the stationary apron 147, is a guide-plate 146, preferably of the curved form shown, so placed that the space between the under side of such guide-plate and the bottom roll 116 and traveling apron 138 is barely sufficient to permit of a finished pencil of the size to be made to pass easily along the passage so formed, which passage will for convenience of description be designated by the reference-letter T, as shown in Figs. 4, 5, 24, and 25. Extending from front to rear of the frame X', above the upper run of the traveling apron 138, is the stationary apron 147, which, like the apron 138, is formed of any suitable fabric, preferably stout canvas, which is kept in a taut condition by being secured at the ends in any desired manner to suitable supports, and located above the said stationary apron 147 and located side by side and almost touching one another, so as to practically form a cover for the said stationary apron from the upper to the lower end of the frame X' and extending across the apron 147 from side to side are a series of small rollers 148, the ends of which are revolubly journaled in suitable boxes or bearings formed in the tops of suitable rods 149, Figs. 5 and 27, which pass down through holes formed for that purpose in the edges of the table 144, and such rods 149 are provided at their lower ends with suitable screw-threads adapted to receive suitable nuts 150, and located upon each of such rods when in position, and between the nuts 150 and the under side of the table 144, is a coil-spring 151, which springs, being always under compression, serve to draw the rollers 148 down upon the table 144, so as to at all times force the stationary apron 147 down upon the traveling apron 138, which rests upon the table 144, and one of such rods, with the accompanying nut and spring in position thereon, is shown in detail in Fig. 27.

Revolubly mounted in suitable bearings in the frame X and extending across the machine immediately beneath the rolling mechanism G is the main shaft K, and immediately to the rear of such main shaft K is located the driving-shaft M, which is revolubly mounted in a similar manner in suitable bearings in the frame X, and upon the main shaft K are mounted, preferably in the order shown in Fig. 22, the various actuating cams and cam-wheels of the machine, consisting of suitably-shaped wheels, of cast-iron or other suitable metal $a, b, c, d, e, f$, and $g$. Of these the wheels $a, d$, and $e$ are each provided on the periphery with a central cog or gear, as shown, which in each case meshes with a suitable smaller gear-wheel, which small wheels are rigidly mounted upon the driving-shaft M, the wheels $a$ to $g$, inclusive, being, of course, rigidly keyed or otherwise secured to the main shaft K. While the use of more than one gear connection between the main and driving shafts is not essential, I prefer to use a plurality of such connections, in order to prevent liability of springing or twisting of either the main or driving shafts.

The wheel $a$ has on its outer side the cam or camway $a'$, which actuates the paper-feed, and on the inner a cam or camway $a^2$, which actuates the lever 120', and also a cam or camway $a^3$, which actuates the curl-forming rod or die 19. The wheel $d$ has on the left side a cam or camway $d'$, which actuates the carrier feed-bar 107, and on the right side a cam or camway $d^2$, which actuates the slide-bar 15, which in turn actuates the curl-forming mandrel 40 and crayon-feeding rod 31, and such cam or camway $d^2$ is for such purpose brought into actuating connection with such slide-bar 15, as shown in Fig. 4, by a cam-pin 152, which is secured to a lever 153, pivoted upon the shaft 5 and to a connecting-rod 154 by a pivotal connection, which connecting-rod is pivotally connected at its forward end to the lower slotted portion of the quadrant or sector-gear 12, the motion of which causes the reciprocation of the rack-gear 15, as hereinbefore described. In like manner the gear-wheel $e$ has on the left side a cam or camway $e'$, which serves to actuate the slide-bars 44 through intervening mechanism, while upon the right side of such wheel $e$ is a similar cam or camway $e^2$, which in like manner actuates the slide-bars 43. The paster-cam $c$, the lifting-plate cam $b$, and the back-plate and middle-roll lifting-cam $g$ are each single cams of simple form and each actuate their respective devices in the manner hereinbefore stated.

The contour of the various cams and camways is shown in the diagram forming Fig. 21, and in such diagram the full lines represent the contour of the cams or camways, naught of the degrees representing the starting point of the rotation. At such point as upon said diagram the contour line of any cam leaves the dotted line coincident therewith, at that number of degrees of rotation does it begin to actuate the mechanism operated thereby; but at such points of the rotation as the line of the contour of any cam coincides with its dotted line the mechanism operated by the cam is at rest and not working.

To facilitate the feeding of the crayons to the curl of the covering-paper, I prefer to form the crayon box or receptable of the form shown and to make the back portion 149' of such box capable of inward and outward movement by pivoting the same at 150', as shown in Figs. 18, 19, and 20, and connecting such pivoted movable back 149' at each end to a connecting-rod 151', which connecting-rods are connected at the bottom by a suitable pivot-joint with links 152', which links are pivotally connected with lugs 153', having screws 154', by which lugs and by plates 155' the crayon-box 21 is secured to the frame of the machine. The pivot connecting the links 152' with the rods 151' is preferably a shaft 156', extending from one of such links to the other, and to this shaft 156', at any convenient point, is connected the rod 155, which is preferably of the bent form shown in Fig. 2, and is vibrated so as to shake and oscillate the back plate 149' of the crayon-box 21 by the toothed wheel 156, and by this oscillation of such back plate the crayons are unerringly shaken down into the groove of the curl-forming die-rod.

In order to make more intelligible the description of the manner of operating the machine herein described and of carrying into effect my improved method of forming pencils, the strip forming the roll of paper to be used as a covering material for the crayons is designated in the drawings by the reference-letter V, while the sheets, each of which forms the covering for one crayon, will be designated after their severance from the roll by the reference-letter V', and the crayons to be covered by such sheets V' will be designated by the reference-letter Y, while the finished pencils will be designated by Y'.

The strip of paper V is preferably of the kind known as "parchmentized" paper, and before being formed into a roll is scored longitudinally of the sheet, or otherwise provided with a plurality of weakened lines, located about an eighth of an inch apart, along which the paper may be easily severed or torn apart into strips, all as described in my Letters Patent of the United States, No. 461,911, before referred to; and in order to form a self-sharpening pencil of the form described in such Letters Patent it is necessary to roll each of the sheets V' around a crayon Y in such manner that each of the weakened lines will, when the sheets are rolled firmly around the crayon, be diagonal to the axis of the roll, forming, as it were, a species of conical screw-thread, so that each of the strips of paper lying between any two of the weakened lines will, when severed from its adjacent strip leave the crayon in the form of a conical helix, so as to uncover the crayon section by section. To accomplish all this and to form a pencil of the kind mentioned in said United States Letters Patent No. 461,911, the curl-forming rod or die 19, the mandrel 40, and the knife and punches or perforating devices are all arranged upon the frame X of the machine, so as to extend across such frame slightly diagonal to the axis of the feed-rolls and of the line of feed of the strip V, so that the sheets V' have their forward and rear edges or ends, and also the curl which is formed in the forward edge or end thereof, all slightly diagonal to the side edges of the strip V and of the sheets V' and to the series of weakened lines upon the sheets which are parallel with the sides thereof; and while I also prefer to have the paster-bar, the carrier feed-bar, and the rolling-rolls also located diagonal to the axis of the feed-rolls, in some cases such paster-bar, carrier feed-bar, and rolling-rolls may be located at right angles to the feed and the carrier-bar will straighten the sheets V' as it carries them rearward; but the angle of the diagonaly of the mechanisms so arranged is so extremely slight in practice (being ordinarily about four [4] millimeters to the decimeter) that it is not perceptible to any great extent in the machine itself even, and for that reason, in Fig. 28 of the drawings hereof, I have shown such diagonal arrangement of the curl-forming, crayon-feeding, and paper-cutting and paper-perforating mechanisms greatly exaggerated as to the angle.

The operation of my improved pencil-machine and the manner of carrying into effect my improved method of manufacturing pencils is as follows: A suitable strip of parchmentized paper or other suitable flexible material V, of the same width as the length of the pencil to be formed, is scored or otherwise provided with a series of weakened lines running longitudinally of such strip, formed into a roll, upon the shaft 71, and the end passed over the roll 72 and between the feed-rolls 73 and 74 and the guide-plates 70 until the end of the sheet of paper projects beyond the knife of the cutting mechanism C, and such knife is brought down once, so as to cut the paper strip diagonally across the end, and this being done, and the crayon-box 21 having been supplied with the required quantity of marking leads or crayons Y, the paste-reservoir having been supplied with the required quantity of paste, glue, or similar adhesive material, and the gas jets or burners 36 having been lighted and the machine set in motion by a suitable driving-belt (not shown) connecting the driving-pulley N on the driving-shaft M with a suitable source of power, the machine will be put in motion. As soon as this is done and the sheet V being in the position shown in Fig. 13, the curl-forming rod or die 19, being also in the position shown in such figure, with the groove 20 thereof upward, and the curl-forming mandrel 40 having been properly heated by the action of the gas-flame of the burners 36, the movement of the cam $d^2$ through the intervening mechanisms actuates the slide-bar 15 toward the left, whereby the mandrel 40 and crayon-feeding rod 31 are each carried to the left, and as soon as the inner end of the mandrel 40 passes beneath the finger 49 on the left side of the machine, which is carried by the slide-bars 44, the said slide-bars 44 are drawn downward by the action of the cam $e'$, and such fingers 49 force the heated mandrel 40 down into the groove 20 of the curl-forming rod or die 19, so as to carry the end of the paper strip V down into such groove, when all the parts wil be in the positions shown in Fig. 14, and as soon as the mandrel 40 has been forced fully into the groove 20 of the curl-forming rod or die 19 such rod 19 is rotated partially to the left by the action of the cam $a^3$ and intervening mechanisms, and as during this movement the sheet of paper V is kept from being drawn rearward by the turning of the rod 19, by reason of the fact that the tension-roller 51 is forced tightly down upon the same, as shown in Fig. 14, the combined rolling, stretching, and heating action causes the end of the sheet of paper to be formed into a permanent curl, as shown, and while the parts are still in the position shown in Fig. 15 the slide-bar 15 is, by the action of its actuating cam, reciprocated back toward the right, and this draws the mandrel 40 out of the curl and at the same time the simultaneous movement of the crayon-feeding rod 31 in such groove 20 forces a crayon along such groove into the curl which has been formed by the heated paper mandrel, such crayon having been dropped by gravity into such groove from the crayon-box 21 when such groove was upright and the crayon-feeding rod 31 was withdrawn therefrom upon the leftward reciprocation of the slide-bar 15, the then position of the crayons and curl-forming rod or die 19 being shown in Fig. 20ᵃ. As soon as the crayon has been inserted in the curl, the slide-bars 44 are forced upward and the tension-roller 51 and fingers 49 assume the positions shown in Fig. 16, and as soon as they have done so the curl-forming rod or die 19 is partially rotated backward toward the rear end of the machine until the groove 20 thereof is upward, when the action of the cam $b$ through the intervening mechanism partially rotates the lifting-cam 55, so as to lift the rearward end of the lifting-plate 53 up into the position shown in Fig. 17, by which the end of the sheet or strip of paper V, having the curl inclosing the crayon, will be lifted up, so that the curl and crayon will be lifted from the groove 20 of the curl-forming rod or die 19, and as soon as the sheet V is in this position, the action of the cam $a'$ through the intervening mechanism actuates the paper-feeding mechanism A, so as to push the strip V rearward, as shown in said Fig. 17, and as soon as the required quantity of paper to form the roll of the desired size to cover the crayon has passed beneath the knife 63 the action of the cam $e^2$ forces down the slide-bars 43, so as to bring the knife and punches forming the operating parts of the paper-cutting mechanism D and paper-perforating mechanism E down upon the strip of paper V, so as to sever the sheet V' from the strip V and provide the said sheet with a line of rpeforations adjacent and about an eighth of an inch or so from the end of the sheet. As soon as the sheet is cut and punched, the knife and punches return to the raised position shown in Figs. 12 to 17, inclusive, and inasmuch as during the downward movement of the knife and punches the carrier feed-bar 107 has been carried to the front up over the gravity-bars 114 and has dropped to the main table 60 and upon the sheet V' immediately forward of the curl inclosing the crayon, the distance between the knife 63 and the supports 115 of the gravity-bar 107 being slightly less than the length of the sheet V', so that the crayon and curl will always be located to the rear of the supports 15 as the sheet V' is being separated by the knife from the strip V, so that the carrier feed-bar 107 will always drop upon the sheet forward of the curl. As soon as the carrier feed-bar has dropped upon the sheet V' and the knife and punches are lifted, such carrier feed-bar is, by the action of its actuating-cam $d'$, moved toward the rear of the machine, and as the narrow knife-like rear edge of such carrier feed-bar strikes against the curl inclosing the crayon it carries the sheet V' rearward with it until the perforated end of such sheet is immediately beneath the paster-bar 96, when the carrier feed-bar stops its rearward movement for an instant, and during the time that the sheet is so stationary the action of the cam $c$ through the intervening mechanism forces down the said paster-bar upon the extreme end of the sheet V', which paster-bar, being inverted as it descends by the action of the fork-cam 98 and pins 100 and 101, and coming down upon the sheet V' into the position shown in Fig. 10, deposits on the extreme end of such sheet, beyond and adjacent to the line of perforations in the same, a sufficient quantity of paste, glue, or other adhesive substance sufficient to cause such end to adhere to the roll formed by the sheet after it has been coiled upon the crayon. The paste having been deposited as described, the paster-bar is lifted and carried upward, turning a half-revolution as it goes, until brought into contact with the perforated under side of the paste-reservoir 94 to receive a fresh supply of paste for the next following sheet. As soon as the paster-bar has returned to its raised position, or even as soon as it leaves the sheet V', the carrier feed-bar 107 begins to again move rearward, so as to carry the sheet with it and force the curl inclosing the crayon between the rolls 116 and 118 and against the roll 117, and as soon as the curl is pushed between said rolls, which are located such a distance apart at this time as to barely permit of the curl and crayon being pushed between them, their rotative action, which is all to the right, as shown in Figs. 24 and 25, will begin to roll the sheet V' around the crayon, as shown in Fig. 24, and as the roll grows larger and larger the upper roll 118 is pushed upward by such roll, and the weight of such roll and the levers 120, in which the same is journaled, serve to make the roll thus formed an extremely-tight one, and in some cases, if preferred, the cam $a^2$, which moves the roll 118, may be made of such a contour as to take a portion of the weight of such roll from the pencil during formation; but I prefer to have the entire weight of such roll rest thereon. As soon as the entire sheet V' has been rolled around the curl and crayon by the action of the three rolls, and when at last the paste-provided end of such sheet comes against the roll so formed, it of course adheres strongly thereto, and to insure such adhesion the completed roll inclosing the crayon is rotated a number of times—say from twenty to fifty—between the rolls after being formed, and after such additional rotations the upper roll 118 is suddenly lifted up from the roll of paper so formed into the position shown in Fig. 25 by the action of the cam $a^2$ on the lever 120', and at the same instant the back plate 119' is by the partial rotation of the pivot-shafts 126 by the action of the cam $g$ through the intervening mechanism moved upward and carries with it the middle or back roll 117 until the same have assumed the positions shown in Fig. 25, and as soon as such back plate and roll 117 are in such raised position the continued rotation of the lower roll 116 carries the finished pencil Y' to the rear and the same falls upon the belt or apron 138, and as such belt or apron is traveling rapidly to the rear such pencil Y' is carried down through the space T, as shown in detail in Fig. 25, and at last is carried under the stationary belt or apron 147, and as it is carried along beneath such stationary belt by the action of such traveling belt or apron it is constantly retarded by the rolls or rollers 148, as such rollers are kept pressed down upon the traveling belt or apron by the action of the springs 151, and as the pencil has to lift up each of said rollers as it passes beneath the same such pencil Y' is a considerable time passing down beneath the stationary belt or apron 147, and being all this time under pressure and being continually rolled upon its own axis as it travels downward the paste or glue which holds the outer end of the strip V', forming the covering of such pencil, has ample opportunity to dry, and consequently when the pencil is at last allowed to drop from the traveling belt or apron at the lower end of the frame X' into a suitable receptacle, as shown in Fig. 5, the same will be ready for use, and there will be no danger of the glued or pasted end of the strip coming loose from the roll, and the construction and speed of the moving parts of this drying device H is preferably such that there are a number of pencils Y' being carried down beneath the stationary apron or belt at the same time, as shown.

In some cases it is preferable to make the contour of the cam $a^2$ such that the roll 118 will not be lowered to its fullest extent until the carrier feed-bar 107 has placed the curl inclosing the crayon in position beneath the same, when such roll 118 is instantly allowed to drop down upon the curl and crayon and the rolling at once begins, and upon the whole I prefer such construction to one in which the said roll 118 is fully lowered and the crayon and curl are pushed in under the same; but either construction may be used. It will of course be understood that the instant the curl and crayon are in position between the rolls the carrier feed-bar 107 is carried forward out of the way, and also that the operation hereinbefore described is continued indefinitely, and that a number of pencils, when the machine is in operation, are in different stages of construction at the same time, the parts working so as not to interfere with one another, but so as to have all parts which can work upon different pencils so working at the same instant in order to save time and to make the manufacture of the pencils continuous.

I have not deemed it necessary to show the manner of scoring the paper herein, nor to show either a top plan view of one of the sheets V' or of the finished pencil in detail, for the reason that neither the sheet nor pencil forms any part of this invention, which is for a machine and method for manufacturing such pencils, which pencils are fully shown, described, and claimed in my hereinbefore-mentioned patent upon such pencil.

It is evident that the various mechanisms herein shown may be used for forming rolls of paper or similar material of other forms and for other purposes than use as pencils, and I do not intend to limit myself to a method or machine for manufacturing pencils of the form described only, as I consider that my invention covers, broadly, the formation of curls, rolls, and rolls covering a central core of any material or rolls formed around a central hollow curl first formed permanently in the end of a sheet of flexible material, which is afterward rolled around the permanent curl to form a roll, and a crayon or other suitable core inserted therein at any time, and mechanisms and methods for bringing about such results in substantially the same way or by substantially similar mechanisms as herein set out.

Many changes in the method and machine shown and described herein may be made without departing from the scope of my invention. For instance, the roll may be formed upon a loose mandrel-rod which is carried rearward in the curl, as is the crayon in the machine shown, and after the rolling of the roll the mandrel-rod may be pushed out and a crayon inserted in the place thereof, either by hand or by suitable mechanism. Again, while I have shown and described herein a method and machine in which a heated mandrel is used for forming the permanent curl in the ends of the sheets of covering material, I do not intend to limit myself to the use of heat in such connection, as it may in some cases be dispensed with; neither do I intend to limit myself to the use of mechanism of any particular form, as I consider that I am entitled to claim, broadly, the combinations one with another of any mechanisms capable of performing substantially the same functions as those herein particularly described, and I do not in any case intend to limit myself strictly to the exact form of construction of my said machine, or any of its parts which is herein shown and described, as it is evident that many changes in the construction, combination, and arrangement of the various parts of said machine, as well as in the various steps of the method herein described and claimed, may be made without departing from the scope of my invention.

Having now particularly described and ascertained the nature of my said invention and in what manner the same is to be performed, what I claim, and desire to secure by Letters Patent, is—

1. The hereinbefore described method of making pencils &c., which consists in providing a sheet of flexible material such as paper &c., with a series of weakened lines, forming a curl in one end of the sheet diagonal to the weakened lines, setting the curl so as to make the same permanent, rolling the rest of the sheet around the curl so that the roll formed will remain in form, and inserting a suitable core or crayon in the curl at any stage of the process.

2. The hereinbefore described method of making pencils &c., which consists in providing a sheet of flexible material such as paper &c., with a series of weakened lines, forming a curl in one end of the sheet diagonal to the weakened lines, setting the curl by heat so as to make the same permanent, rolling the rest of the sheet around the curl so that the roll formed will remain in form, and inserting a suitable core or crayon in the curl at any stage of the process.

3. The hereinbefore described method of making pencils &c., which consists in providing a sheet of flexible material such as paper &c., with a series of weakened lines, forming a curl in one end of the sheet diagonal to the weakened lines, setting the curl so as to make the same permanent, rolling the rest of the sheet around the curl, securing the outer end of the sheet to the roll thus formed, and inserting a suitable core or crayon in the curl at any stage of the process.

4. The hereinbefore described method of making pencils &c., which consists in providing a sheet of flexible material such as paper &c., with a series of weakened lines, forming a curl in one end of the sheet diagonal to the weakened lines, setting the curl by heat so as to make the same permanent, rolling the rest of the sheet around the curl, securing the outer end of the sheet to the roll thus formed, and inserting a suitable core or crayon in the curl at any stage of the process.

5. The hereinbefore described method of making pencils &c., which consists in providing a sheet of flexible material such as paper &c., with a series of weakened lines, forming a curl in one end of the sheet diagonal to the weakened lines, setting the curl by heat so as to make the same permanent, inserting a suitable marking-lead or crayon in the curl, rolling the rest of the sheet around the curl and crayon, and securing the outer edge of the sheet to the roll thus formed.

6. The hereinbefore described method of making pencils &c., which consists in forming a curl in the end of a sheet of flexible material such as paper &c., setting the curl so as to make the same permanent, rolling the rest of the sheet around the curl so that the roll formed will remain in form, and inserting a suitable core or crayon in the curl at any stage of the process.

7. The hereinbefore described method of making pencils &c., which consists in forming a curl in the end of a sheet of flexible material such as paper &c., setting the curl by heat so as to make the same permanent, rolling the rest of the sheet around the curl, securing the outer end of the sheet to the roll thus formed, and inserting a suitable core or crayon in the curl at any stage of the process.

8. The hereinbefore described method of making pencils &c., which consists in forming a curl in the end of a sheet of flexible material such as paper &c., setting the curl by heat so as to make the same permanent, inserting a suitable core or crayon in the curl, rolling the rest of the sheet around the curl and crayon, and securing the outer end of the sheet to the roll thus formed.

9. In a machine of the class described, the combination with a paper-feeding mechanism, of a curl-forming mechanism, crayon-supplying mechanism, pasting mechanism, and rolling mechanism, substantially as shown and described.

10. In a machine of the class described, the combination with a paper-feeding mechanism, of a curl-forming mechanism, crayon-supplying mechanism, cutting mechanism, pasting mechanism, and rolling mechanism, substantially as shown and described.

11. In a machine of the class described, the combination with a paper-feeding mechanism, of a curl-forming mechanism, crayon-supplying mechanism, cutting mechanism, perforating mechanism, pasting mechanism, and rolling mechanism, substantially as shown and described.

12. In a machine of the class described, the combination with a curl-forming mechanism, of mechanism for supplying a suitable core or crayon to the coil after the same is formed, and a rolling mechanism for rolling the sheet in which is the curl inclosing the crayon around such curl and crayon, substantially as shown and described.

13. In a machine of the class described, the combination with a paper-feeding mechanism, of a curl-forming mechanism, mechanism for supplying a suitable core or crayon to the curl after the same is formed, mechanism for supplying paste &c., to the sheet after the insertion of the crayon or core, and a rolling mechanism for rolling the sheet around the curl and crayon, substantially as shown and described.

14. In a machine of the class described, the combination with a paper-feeding mechanism, of a curl-forming mechanism, mechanism for supplying a suitable core or crayon to the curl after the same is formed, cutting mechanism for cutting the sheet after the insertion of the crayon or core, mechanism for supplying paste &c., after the insertion of the crayon, or core, and a rolling mechanism for rolling the sheet around the curl and crayon after the same is supplied with paste, substantially as shown and described.

15. In a machine of the class described, the combination with a paper-feeding mechanism, of a curl-forming mechanism, crayon-feeding mechanism, pasting mechanism, rolling mechanism, and drying mechanism, substantially as shown and described.

16. In a machine of the class described, the combination with a paper-feeding mechanism, of a curl-forming mechanism, crayon-feeding mechanism, paper-cutting mechanism, pasting mechanism, rolling mechanism, and drying mechanism, substantially as shown and described.

17. In a machine of the class described, the combination with a paper-roll holder, of an intermittently actuated paper-feeding mechanism, a curl-forming mechanism, crayon-feeding mechanism, paper-cutting mechanism, pasting mechanism, rolling mechanism, and drying mechanism, substantially as shown and described.

18. In a machine of the class described, the combination with a paper-roll holder, of an intermittently actuated paper-feeding mechanism, a curl-forming mechanism, crayon-feeding mechanism, paper-cutting mechanism, paper-perforating mechanism, pasting mechanism, rolling mechanism, and drying mechanism, substantially as shown and described.

19. In a machine of the class described, the mutual combination of a paper-feeding mechanism A, curl-forming mechanism B, crayon-supplying mechanism C, paper-perforating mechanism E, pasting-mechanism F, and rolling-mechanism G, substantially as shown and described.

20. In a machine of the class described, the mutual combination of a paper-feeding mechanism A, curl-forming mechanism B, crayon-supplying mechanism C, paper-cutting mechanism D, paper-perforating mechanism E, pasting-mechanism F, rolling mechanism G, and drying mechanism H, substantially as shown and described.

21. In a machine of the class described, the mutual combination of a paper-feeding mechanism A, curl-forming mechanism B, crayon-supplying mechanism C, paper-cutting mechanism D, paper-perforating mechanism E, pasting-mechanism F, rolling-mechanism G, and drying-mechanism H, substantially as shown.

22. In a machine of the class described, the combination with a curl-forming mechanism B, of a crayon-supplying mechanism C, substantially as shown and described.

23. In a machine of the class described, the combination with a curl-forming mechanism B, of a crayon-supplying mechanism C, a pasting mechanism F, and a rolling mechanism G, substantially as shown and described.

24. In a machine of the class described, the combination with a curl-forming mechanism B, of a crayon-supplying mechanism C, pasting-mechanism F, rolling mechanism G, and an automatic carrier or feeding-device for passing the material from the pasting to the rolling mechanism, substantially as shown and described.

25. In a machine of the class described, the combination with an intermittently actuated paper-feeding mechanism A, of a curl-forming mechanism B, crayon supplying mechanism C, paper-cutting mechanism D, pasting mechanism F, and rolling-mechanism G.

26. In a machine of the class described, the combination with an intermittently actuated paper-feeding mechanism A, of a curl-forming mechanism B, a crayon-supplying mechanism C, a paper-cutting mechanism D, a paper-perforating mechanism F, and a rolling-mechanism G, substantially as shown and described.

27. In a machine of the class described, the combination with the paper-roll holder of a paper-feeding mechanism A, a curl-forming mechanism B, and a paper cutting mechanism D, the mechanisms B and D extending diagonally across the path of the paper as the same is fed to them by the feeding mechanism, substantially as shown and described.

28. In a machine of the class described, the combination with the paper-feeding mechanism A, of the curl-forming mechanism B, the mechanism B extending diagonally across the path of the paper-feed, substantially as shown and described.

29. In a machine of the class described, the combination with a paper-feeding mechanism A, of a curl-forming mechanism B, crayon-supplying mechanism C, pasting mechanism F, and rolling mechanism G, the mechanisms B. C. and F and G, being located diagonally to the path of the paper as the same is fed along by the paper-feeding mechanism A, substantially as shown and described.

30. In a machine of the class described, the combination with a paper-feeding mechanism A, of a curl-forming mechanism B, a cutting mechanism D, and a rolling mechanism G, the mechanisms D and E extending diagonally across the path of the paper fed to them by the feeding mechanism A, substantially as shown and described.

31. In a machine of the class described, the combination with the curl-forming rod or die 19, having the groove 20, of a curl-forming mandrel 40 adapted to enter the groove 20, and means for partially and reciprocally rotating the rod or die 19, substantially as shown and described.

32. In a machine of the class described, the combination with the curl-forming rod or die 19, having the groove 20, of the curl-forming mandrel 40, a crayon-box or receptacle 21 in communication with one end of the rod or die 19, a crayon feeding rod 31, means for reciprocating the crayon-feeding rod and the mandrel, means for forcing the mandrel down into the groove 20 of the rod 19, and means for partially and reciprocally rotating the rod or die 19, substantially as shown and described.

33. In a machine of the class described, the combination with the curl-forming rod or die 19 having the groove 20, of the curl-forming mandrel 40 adapted to enter the groove 20, means for partially and reciprocally rotating the rod or die 19, and means for heating the mandrel, substantially as shown and described.

34. In a machine of the class described, the combination with the curl-forming rod or die 19 having the groove 20, of the curl-forming mandrel 40, a crayon-box or receptacle 21 in communication with one end of the rod or die 19, a crayon-feeding rod 31, means for reciprocating the crayon-feeding rod and the mandrel, means for forcing the mandrel down into the groove 20 of the rod 19, and means for partially and reciprocally rotating the rod or die 19, substantially as shown and described.

35. In a machine of the class described, the combination with a paper-roll-holder, of an intermittently actuated paper-feeding mechanism, a curl-forming rod or die 19 having the groove 20, a mandrel 40, means for forcing the mandrel down into the groove 20, means for heating the mandrel, a tension-roller 51, a paper-cutting mechanism D, and a lifting-plate 52, substantially as shown and described.

36. In a machine of the class described, the combination with a paper-roll-holder, of an intermittently actuated paper-feeding mechanism, a curl-forming rod or die 19, having the groove 20, a mandrel 40, means for heating the mandrel, a tension-roller 51, a paper-cutting mechanism D, paper-perforating mechanism E, and a lifting-plate 52, substantially as shown and described.

37. In a machine of the class described, the combination with a paper-roll-holder of an intermittently actuated paper-feeding mechanism, a curl-forming rod or die 19 having the groove 20, a mandrel 40, means for heating the mandrel, reciprocating slide-bars 44, a tension roller 51 carried by such slide-bars 44; and fingers 49 for forcing the mandrel 40 down into the groove 20 also carried by the slide-bars 44, substantially as shown and described.

38. In a machine of the class described, the combination with a paper-roll-holder, of an intermittently actuated paper-feeding-mechanism, curl-forming rod or die 19 having the groove 20, a mandrel 40, means for heating the mandrel, reciprocating slide-bars 44, a tension roller 51 carried by such slide-bars 44, fingers 49 for forcing the mandrel 40 down into the groove 20 also carried by the slide-bars 44, reciprocating slide-bars 43, and a paper-cutting knife carried by the slide-bars 44, substantially as shown and described.

39. In a machine of the class described, a rolling mechanism having three positively rotated rolls, the center roll of which is smaller than the other two, and one of the larger rolls of which is moved away from the other large roll as the roll of paper or other material formed by their joint action grows in size, substantially as shown and described.

40. In a machine of the class described, the combination one with another in the rolling mechanism thereof, of a roll 118, a roll 116, and a middle or back roll 117 of smaller diameter than either of the other rolls, all of said rolls being positively rotated in the same direction, substantially as described and for the purposes set forth.

41. In a machine of the class described, the combination one with another in the rolling mechanism thereof, of a roll 118, a roll 116, a middle or back roll 117 of smaller diameter than either of the other rolls, and mechanism for positively rotating all of said rolls in the same direction at substantially the same peripheral speed, substantially as described and for the purposes set forth.

42. In a machine of the class described, the combination one with another in the rolling mechanism thereof, of the roll 116, roll 118, middle or back roll 117 of smaller diameter than and located between the rolls 116 and 118, means for varying the distance between the rolls 118 and 116, and means for lifting or moving the roll 117, substantially as described and for the purposes set forth.

43. In a machine of the class described, the combination one with another in the rolling mechanism thereof, of a roll 118, a roll 116, a middle or back roll 117 of smaller diameter than either of the other rolls, gearing connecting the three rolls together so that they will all be rotated in the same direction at substantially the same peripheral speed, means for varying the distance between the rolls 118 and 116, and means for actuating the roll 117 so as to allow the escape from between the rolls of the roll of paper &c., formed by their joint action, substantially as shown and described.

44. In a machine of the class described, the combination with the roll 116, of the roll 118, means for positively rotating each of said rolls, a middle or back roll 117 located between the rolls 116 and 118 revolubly mounted in journals 86 carried by the back-plate 119', pivot-shafts 126 secured to the back-plate 119' and mounted in journals 127, means for partially rotating the shaft 126 so as to move the back-plate 119', and means for rotating the roll 117, substantially as shown and described.

45. In a machine of the class described, the combination with the roll 116, of the roll 118, means for positively rotating each of said rolls, a middle or back-roll 117 located between the rolls 116 and 118 and revolubly mounted in journals 86 carried by the back-plate 119', pivot-shafts 126 secured to the back-plate 119', movably mounted in journals 127, means for partially rotating the shafts 126 so as to move the back-plate 119' a sleeve 132 revolubly mounted upon one of the pivot-shafts 126, a gear-wheel 134 secured to the sleeve 132, meshing with the gear-wheel 125 secured to the roll 117, a gear-wheel 133 also secured to the sleeve 132 meshing with a gear-wheel 135, rigidly mounted upon the shaft 116' of the roll 116, substantially as shown and described.

46. In a machine of the class described, the combination with the roll 116 revolubly supported in suitable bearings, of the roll 118 revolubly supported by the ends of suitable levers 120, means for positively rotating the rolls 116 and 118, a shaft 121 upon which the levers 120 are rigidly secured, journals in which the shaft 121 is mounted so as to be partially rotatable therein, a lever 120' secured to the shaft 121, a cam for actuating the lever 120' so as to partially rotate the shaft 121, a middle or back roll 117 located between the rolls 116 and 118 revolubly mounted in journals 86 carried by the back-plate 119', pivot-shafts 126 secured to the back-plate 119' and mounted in journals 127, means for partially rotating the shaft 126 so as to move the back-plate 119', and gearing by which the roll 117 is rotated, substantially as shown and described.

47. In a machine of the class described, the drying mechanism having the endless traveling belt or apron 138, the stationary belt or apron 147 located above the belt or apron 138, rollers 148 located above the apron or belt 147 and means for forcing the rollers 148 down upon the belt or apron 147, so as to press the same toward the belt or apron 138, substantially as shown and described.

48. In a machine of the class described, a drying mechanism having the endless traveling belt or apron 138, the stationary belt or apron 147, a table located beneath the upper run of the traveling belt or apron and forming a support therefor, a series of rollers 148 journaled in rods 149 located above the stationary belt or apron 147, and springs 149, for forcing the rollers down upon the table over which the upper run of the traveling belt 138 travels, substantially as shown and described.

Signed at the city of Philadelphia, in the county of Philadelphia, this 26th day of December, A. D. 1894.

FREDERICK E. BLAISDELL.

Witnesses:
GEO. W. REED,
THOS. S. REED.